US007769523B2

(12) United States Patent
Matsushima et al.

(10) Patent No.: US 7,769,523 B2

(45) Date of Patent: Aug. 3, 2010

(54) METHOD AND SYSTEM FOR ESTIMATING AN AIR-INTAKE AMOUNT OF AN INTERNAL COMBUSTION ENGINE, AND INTERNAL COMBUSTION ENGINE

(75) Inventors: Hirohide Matsushima, Kobe (JP); Kenji Takenaka, Kobe (JP); Takashi Abe, Akashi (JP); Ryo Suzuki, Kobe (JP); Takuya Sakamoto, Akashi (JP); Yoshinobu Mori, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 288 days.

(21) Appl. No.: 11/998,854

(22) Filed: Nov. 29, 2007

(65) Prior Publication Data

US 2008/0215229 A1 Sep. 4, 2008

(30) Foreign Application Priority Data

| | | |
|---|---|---|
| Nov. 29, 2006 | (JP) | 2006-321663 |
| Oct. 12, 2007 | (JP) | 2007-266711 |
| Oct. 12, 2007 | (JP) | 2007-266726 |

(51) Int. Cl.

| | |
|---|---|
| ***G06F 19/00*** | (2006.01) |
| ***F02M 51/00*** | (2006.01) |
| ***F02D 41/30*** | (2006.01) |

(52) U.S. Cl. .................... 701/103; 701/104; 701/115; 123/480

(58) Field of Classification Search ................. 123/295, 123/305, 478, 480, 486, 491–493; 701/101–105, 701/110, 113, 115

See application file for complete search history.

(56) References Cited

U.S. PATENT DOCUMENTS

| | | | | |
|---|---|---|---|---|
| 4,903,668 | A * | 2/1990 | Ohata | 123/478 |
| 6,578,551 | B2 * | 6/2003 | Yuya et al. | 123/491 |
| 6,588,403 | B2 * | 7/2003 | Yomogida | 123/478 |
| 6,792,927 | B2 * | 9/2004 | Kobayashi | 123/480 |
| 2008/0275627 | A1 * | 11/2008 | Matsunaga | 701/108 |

FOREIGN PATENT DOCUMENTS

| | | | | |
|---|---|---|---|---|
| JP | 62-101855 | | 5/1987 | |
| JP | 2006022708 | A * | 1/2006 | 701/104 |

* cited by examiner

*Primary Examiner*—Willis R Wolfe, Jr.

(74) *Attorney, Agent, or Firm*—Alleman Hall McCoy Russell & Tuttle LLP

(57) ABSTRACT

A method of estimating an air-intake amount of an internal combustion engine is provided. The method may comprise detecting a fluid energy amount in an interior of an air-intake passage at first and second points in time while an intake valve is closed from a compression stroke to an exhaust stroke, and calculating a predicted air-intake amount using the values of the fluid energy amounts at the first and second points with reference to an air-intake amount calculation map showing a correlation between the values of the fluid energy amounts at the first and second points and the predicted air-intake amount in the intake stroke, the air-intake amount calculation map being pre-created by finding the values of the fluid energy amounts in the air-intake passage at the first and second points and the air-intake amount, for plural running states of the internal combustion engine.

18 Claims, 26 Drawing Sheets

METHOD AND SYSTEM FOR ESTIMATING AN AIR-INTAKE AMOUNT OF AN INTERNAL COMBUSTION ENGINE, AND INTERNAL COMBUSTION ENGINE

TECHNICAL FIELD

The present invention relates to a method and system for estimating an air-intake amount in each intake stroke in an internal combustion engine suitable for use with vehicles such as motorcycles, all terrain vehicles (ATVs), or personal watercraft (PWC), before start of the corresponding intake stroke, and the internal combustion engine equipped with the estimating system.

BACKGROUND

Internal combustion engines such as engines mounted in motorcycles and other vehicles are commonly equipped with fuel injectors configured to inject an optimal amount of fuel to fresh air taken in from outside and flowing in an air-intake passage of the engine at optimal timings, for the purposes of improvement of an output power and fuel efficiency and of emitting a clean exhaust gas.

Such a fuel injector is configured to inject in each intake stroke an amount of the fuel according to a load state and a rotation state of the associated internal combustion engine. Actually, a part of the fuel injected from the fuel injector adheres onto a wall surface of the air-intake passage and is vaporized, and the vaporized fuel is fed to a cylinder as a fuel for either one of the next two intake strokes rather than for the corresponding intake stroke.

When the internal combustion engine is running in a steady running state under the above described condition, the amount of the fuel that adheres onto the wall surface and the amount of the fuel vaporized from the fuel adhering onto the wall surface are balanced so that an optimal amount of fuel is fed to the cylinder in each intake stroke.

However, when the engine is changing its running state, namely, in a transitional running state that is an acceleration state or a deceleration state, the amount of the fuel that is injected from the fuel injector and adheres onto the wall surface and the amount of the fuel vaporized from the fuel adhering to the wall surface do not match. This makes it difficult to obtain a desired acceleration or deceleration state or otherwise an optimal combustion state. To be specific, in the acceleration state, the amount of fuel that adheres onto the wall surface becomes more than the amount of fuel vaporized, and an air-fuel ratio is increased because of a lean air-fuel ratio. As a result, the desired acceleration state cannot be obtained. On the other hand, in the deceleration state, the air-fuel ratio is decreased because of an rich air-fuel ratio, making it difficult to obtain a clean exhaust gas and to obtain desired deceleration.

In the past, in order to obtain a correct air-fuel ratio even in the transitional running state, there has been known a fuel injection controller for controlling the fuel injector which is configured to execute compensation control depending on the condition of the transitional running state in such a manner that the amount of fuel to be injected is increased in the acceleration state of the internal combustion engine and is decreased in the deceleration state (see Japanese Patent Publication No. Sho. 62-101855).

In the above described compensation control, however, the fuel injection controller executes the compensation control based on a fuel injection amount calculation base map using as parameters, an engine speed, a throttle opening degree, and an air-intake pressure, to determine the amount of fuel to be injected in the corresponding intake stroke. The transitional running state, particularly the transitional running state including a large acceleration state or a large deceleration state, is varied significantly with time. As a result, a time lag in the compensation control occurs, making it difficult to feed the optimal amount of fuel at optimal timings.

The compensation control is executed with reference to the fuel injection amount calculation base map showing a complicated correlation between the engine speed, the throttle opening degree, the air-intake pressure, etc., from the steady running state to the transitional running state of the internal combustion engine. For this reason, if a control content (i.e., a controlled parameter) of the compensation control is compensated to eliminate the time lag in the acceleration state, then an exhaust gas may be changed into an unfavorable one in the deceleration or other states, or otherwise a driving feeling may become worse. Thus, it is difficult in many cases to compensate the controlled parameters.

SUMMARY OF THE INVENTION

The present invention addresses the above described conditions, and an object of the present invention is to provide a method and system that are capable of estimating an air-intake amount before start of an intake stroke to feed an optimal amount of fuel to a cylinder without time lag in acceleration and deceleration states, and an internal combustion engine equipped with the estimating system.

According to a first aspect of the present invention, there is provided a method of estimating an air-intake amount of an internal combustion engine, comprising detecting a value of a fluid energy amount in an interior of an air-intake passage of the engine at a first point and a value of the fluid energy amount in the interior of the air-intake passage in the air-intake passage at a second point that is apart in time from the first point in a period during which an intake valve is closed from a compression stroke to an exhaust stroke in one cycle of the internal combustion engine by a detecting device that is disposed in the air-intake passage to detect the fluid energy amount; and calculating a predicted air-intake amount in an intake stroke of the engine by a calculation using the values of the fluid energy amounts at the first and second points with reference to an air-intake amount calculation map showing a correlation between the values of the fluid energy amounts at the first and second points and the predicted air-intake amount in the intake stroke in which the fuel is injected, the air-intake amount calculation map being pre-created by finding the values of the fluid energy amounts in the air-intake passage at the first and second points and the air-intake amount, for plural running states of the internal combustion engine. It should be noted that the second point may be apart in a crank angle from the first point.

In accordance with the above method, values of at least one of the fluid energy amounts within the air-intake passage at least two points, i.e., the first point and the second point that is apart in time from the first point in the period during which the intake valve is closed in one cycle of the internal combustion engine are detected. For example, an air-intake pressure, a flow rate, and a fluid speed, may be detected, and using the detected values and with reference to the air-intake amount calculation map, the predicted air-intake amount in the intake stroke in which the fuel is injected can be estimated before start of injecting the fuel. The amount of the fuel based on the predicted air-intake amount can be calculated, and the fuel is fed to the cylinder in such a manner that the fuel is decreased in the deceleration state and is increased in the acceleration state to achieve an optimal air-fuel ratio. As a result, generation of a clean exhaust gas is facilitated, and smooth acceleration and deceleration without time lag is achieved in running states including the transitional running states of the internal combustion engine.

In the above method, the detecting device may be at least one of a pressure sensor, a flow rate sensor, and a fluid speed sensor, and the value of the fluid energy amount is one of a pressure value, a flow rate value, and a fluid speed value.

In the above method, the air-intake amount calculation map may be a three-dimensional map. The three-dimensional map enables the method of estimating the air-intake amount quickly, and can be easily altered according to an engine characteristic in a running state.

In the above method, the three-dimensional map may have an X-axis indicating the detected value of the fluid energy amount at the first point, a Y-axis perpendicular to the X-axis indicating the value of the fluid energy amount of the second point, and a Z-axis perpendicular to the X-axis and the Y-axis indicating the value of the intake-amount corresponding to the values of the first and second points, which is a value on the air-intake amount calculation map that is obtained by extending in the Z-axis direction an intersection of the X and Y coordinates of the first point on the X-axis and of the second point on the Y-axis.

According to another aspect of the present invention, there is provided an air-intake amount estimating system for an internal combustion engine, comprising a detecting device that is disposed in an air-intake passage of the internal combustion engine and is configured to detect a value of a fluid energy amount in an interior of the air-intake passage; a memory configured to store an air-intake amount calculation map pre-created to show a correlation between the values of the fluid energy amount in the interior of the air-intake passage and a predicted air-intake amount in an intake stroke in which a fuel is injected; and a processing unit configured to calculate the predicted air-intake amount in the intake stroke, using data relating to a value of the fluid energy amount in the interior of the air-intake passage at a first point and a value of the fluid energy amount in the interior of the air-intake passage at a second point that is apart in time from the first point in a period during which an intake valve is closed from a compression stroke to an exhaust stroke in one cycle of the internal combustion engine, the data being obtained from the detecting device, and with reference to the air-intake amount calculation map stored in the memory. In accordance with the air-intake amount estimating system, the method of estimating the air-intake amount of the first embodiment can be easily carried out.

In the above air-intake amount estimating system, the air-intake amount calculation map may be a three-dimensional map in which the X-axis indicates the detected value of the fluid energy amount at the first point, the Y-axis, perpendicular to the X-axis, indicates the value of the fluid energy amount of the second point, and the Z-axis, perpendicular to the X-axis and the Y-axis, indicates the value of the predicted intake-amount corresponding to the values of the first and second points, which is a value on the air-intake amount calculation map that is obtained by extending in the Z-axis direction an intersection of the X and Y coordinates of the first point on the X-axis and of the second point on the Y-axis.

In the above air-intake amount estimating system, the detecting device may be a at least one of the pressure sensor value, the flow rate sensor value, and the fluid speed sensor value, and the value of the fluid energy amount is one of a pressure value, a flow rate value, and a fluid speed value.

According to a further aspect of the present invention, there is provided an internal combustion engine comprising a fuel injection controller configured to determine an actual fuel injection amount of a fuel injected from a fuel injector into an interior of an air-intake passage of the engine; wherein the fuel injection controller is configured to estimate a predicted air-intake amount in an intake stroke in which the fuel is injected, and to determine the actual fuel injection amount of the fuel based on the estimated predicted air-intake amount. The term “actual fuel injection amount” means an amount of the fuel actually injected from the fuel injector.

In accordance with the internal combustion engine, the fuel injection controller can execute the fuel injection control based on the predicted air-intake amount in the intake stroke in which the fuel is injected in the transitional running state that is the acceleration state or the deceleration state, and the predicted air-intake amount can be obtained before start of the intake stroke. Therefore, responsiveness of the internal combustion engine to the throttle operation can be improved. As a result, the acceleration and deceleration smoothly occur, and a clean exhaust gas can be generated in the deceleration as well as in the acceleration state.

In the above internal combustion engine, the fuel injection controller may be configured to determine the actual fuel injection amount by executing a base fuel injection amount determination control for determining a base fuel injection amount using as parameters an engine speed, a throttle opening degree, and an air-intake pressure of the internal combustion engine before injecting the fuel, and by executing a compensation control of the base fuel injection amount based on the predicted air-intake amount. The fuel injection controller executes the compensation control based on the predicted air-intake amount corresponding to the fuel that will be fed to the cylinder in the intake stroke in which the fuel is injected, independently of the base fuel injection amount determination control in the transitional running state that is the acceleration state or the deceleration state, and obtains the predicted air-intake amount before start of the intake stroke. Therefore, a correct amount of fuel can be fed to the cylinder immediately. As a result, responsiveness of the internal combustion engine to a rider’s throttle operation can be improved. In addition, the base fuel injection amount can be compensated based on the compensation value or the compensation amount from the predicted air-intake amount and an optimal air-fuel ratio of the internal combustion engine so that the optimal amount of fuel according to the conditions of the intake stroke is injected without time lag. Thus, the internal combustion engine is able to respond highly to the rider’s throttle operation. Therefore, the acceleration and deceleration smoothly occur, and a clean exhaust gas can be generated in the deceleration in addition to the acceleration state. As described above, since the compensation control is executed based on the predicted air-intake amount independently of the base fuel injection amount determination control, alternation of the compensation control will not substantially affect the base fuel injection amount determination control, which has a complicated correlation between parameters such as the engine speed, the throttle opening degree, an engine load, and a temperature, under various driving conditions. This facilitates alternation of the base fuel injection amount determination control and the compensation control.

In the above internal combustion engine, the compensation control may be executed based on an amount of the fuel adhering onto a wall surface of the air-intake passage and an amount of the fuel vaporized from the fuel on the wall surface to be fed to a cylinder. Thus, a correct air-fuel ratio is obtained in the acceleration and deceleration states in which the amount of fuel that adheres onto the wall surface and the amount of fuel that is vaporized from the fuel adhering onto the wall surface change. As a result, the acceleration and deceleration states smoothly occur, and a favorable combustion state and a cleaner exhaust gas can be obtained.

In the above internal combustion engine, the predicted air-intake amount may be determined based on a detected value of a fluid energy amount of air-intake within the air-intake passage. This is because a change in the throttle opening degree according to the rider's throttle operation immediately brings about a change in the fluid energy amount within the air-intake passage. So, by estimating the predicted air-intake amount in the intake stroke in which the fuel is injected, the base fuel injection amount obtained in the base fuel injection amount determination control is compensated based on the compensation value or the compensation amount obtained by the compensation control executed based on the predicted air-intake amount.

In the above internal combustion engine, the value of the fluid energy amount of air-intake may be a value of at least one of the air-intake pressure, the air-intake amount and the air-intake speed.

In the above internal combustion engine, the predicted air-intake amount may be determined based on a value of the engine speed of the internal combustion engine. This makes it possible to reflect an increase/decrease of the amount in the air-fuel ratio according to a difference of the engine speed (or engine speed range) of the internal combustion engine.

In the above internal combustion engine, the detected value of the fluid energy amount may include values detected at least at a first point and a second point that is apart in time from the first point in a period during which an intake valve is closed from a compression stroke to an exhaust stroke in one cycle of the internal combustion engine. Thus, the predicted air-intake amount that enables high responsiveness of the internal combustion engine can be calculated correctly and easily.

In the above internal combustion engine, one of the first and second points may be near a bottom dead center at which the compression stroke of the internal combustion engine starts.

In the above internal combustion engine, the fuel injection controller has an air-intake amount calculation map pre-created to show a correlation between the air-intake amount of the engine and the values of the energy amounts at the first and second points, for plural running states of the engine, and the predicted air-intake amount may be calculated with reference to the air-intake amount calculation map, by substituting the detected values of the fluid energy amounts at the first and second points. Thus, the predicted air-intake amount can be obtained quickly.

In the above internal combustion engine, the fuel injector may include a first fuel injector provided in the air-intake passage, and a second fuel injector provided in the air-intake passage at a region to be located upstream of the first fuel injector; and the fuel injection controller may be configured to control the first fuel injector and the second fuel injector in such a manner that in a lower output range of the internal combustion engine, the first fuel injector injects the fuel in a large part, while in a higher output range of the internal combustion engine that is higher than the lower output range, the first fuel injector and the second fuel injector inject the fuel of the determined actual fuel injection amount with a predetermined fuel injection amount ratio. Thus, the present invention is applicable to the twin-injector high performance internal combustion engine equipped with the two fuel injectors consisting of the first fuel injector and the second fuel injector in the air-intake passage.

In the above internal combustion engine, the fuel injection controller may be configured to control the first fuel injector and the second fuel injector so that in a transitional running state that is an acceleration state in which the first fuel injector and the second fuel injector inject the fuel, the predetermined fuel injection amount ratio between the first fuel injector and the second fuel injector in a steady running state of the internal combustion engine is compensated such that a rate of a fuel injection amount of the first fuel injector is increased and a rate of a fuel injection amount of the second fuel injector is decreased for a moment. In this configuration, even when increasing the amount of fuel fed from the second fuel injector disposed apart from an intake port is delayed, a lean spike state in the air-fuel ratio may be avoided in the acceleration state.

In the above internal combustion engine, the fuel injection controller may be configured to control the first fuel injector and the second fuel injector so that in a transitional running state that is a deceleration state from a state where the first fuel injector and the second fuel injector inject the fuel, the predetermined fuel injection amount ratio between the first fuel injector and the second fuel injector in a steady running state of the internal combustion engine is compensated such that a rate of a fuel injection amount of the first fuel injector is decreased and a rate of a fuel injection amount of the second fuel injector is increased for a moment. In this configuration, even when decreasing the amount of fuel fed from the second fuel injector disposed apart from an intake port is delayed, the air-fuel ratio does not become overly rich in the deceleration state.

The above and further objects and features of the invention will more fully be apparent from the following detailed description with accompanying drawings.

DETAILED DESCRIPTION OF THE PREFERRED EMBODIMENTS

Hereinafter, embodiments of an internal combustion engine of the present invention will be described with reference to the accompanying drawings. By way of example, an engine mounted in a motorcycle will be specifically described.

Embodiment 1

Figure 1:
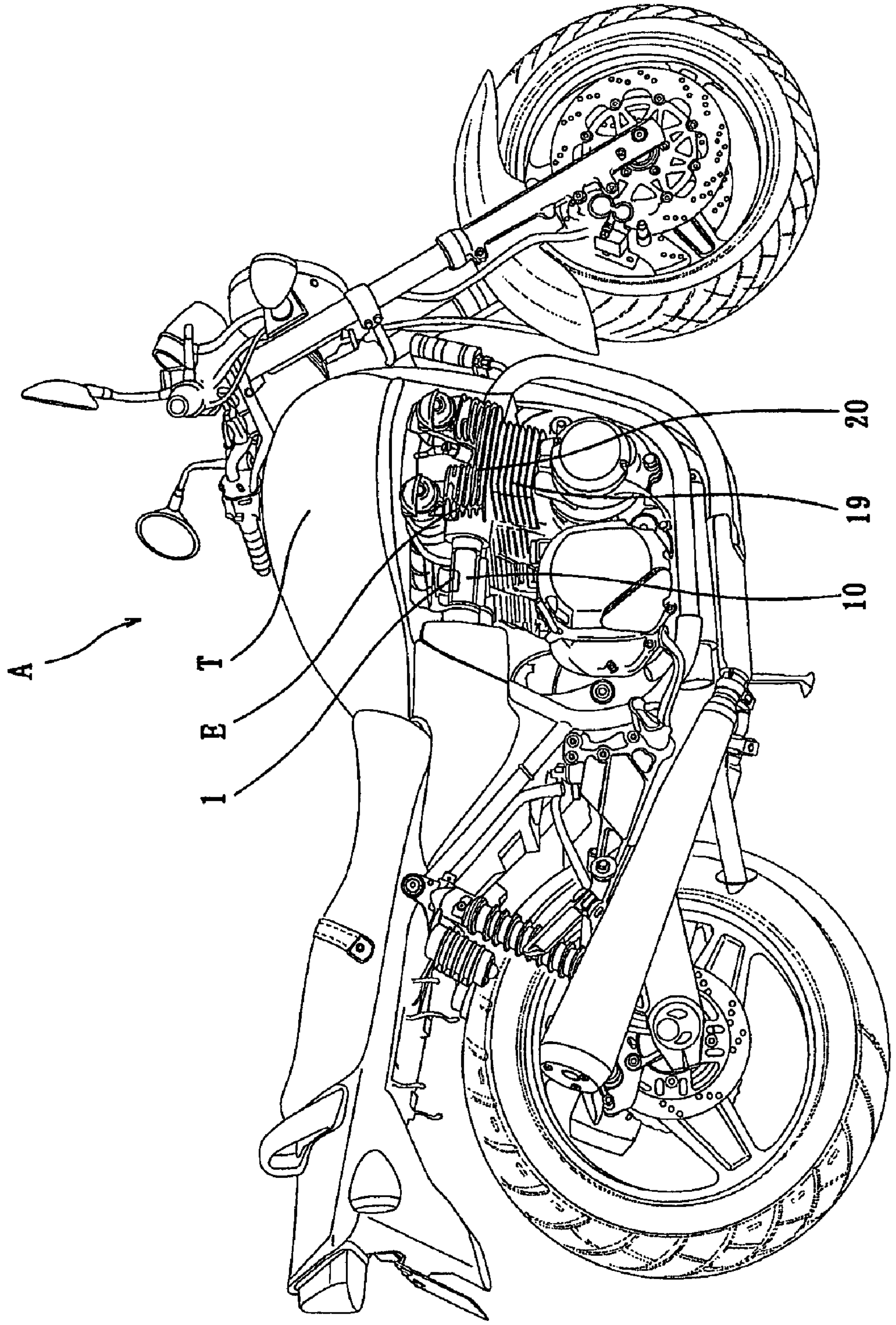
FIG. 1 is a perspective view showing a motorcycle equipped with a multi-cylinder engine (four-cylinder engine) which includes an air-intake amount estimating system according to embodiments of the present invention.
Figure 2:
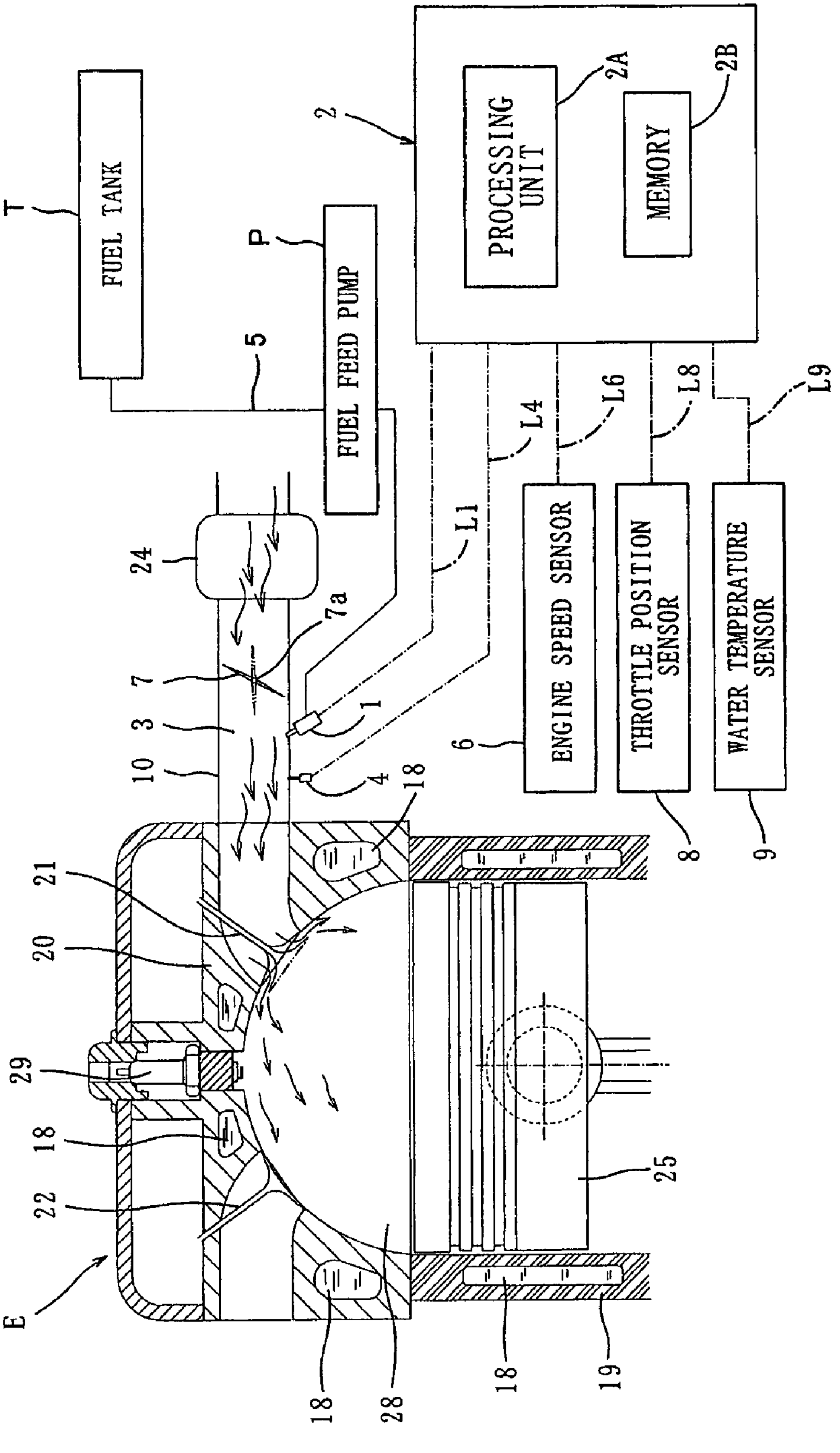
FIG. 2 is a block diagram schematically showing a substantial part of the multiple-cylinder engine mounted in the motorcycle of FIG. 1.

FIG. 1 is a perspective view showing a motorcycle A equipped with a multi-cylinder engine E according to the embodiments of the present invention. In this embodiment, the multi-cylinder engine E is an in-line four-cylinder DOHC (double overhead camshaft) engine. FIG. 2 is a block diagram showing components of the multiple-cylinder engine E mounted in the motorcycle A of FIG. 1.

Turning now to FIG. 1, the engine E is equipped with an air-intake amount estimating system mounted in the motorcycle A. The engine E includes an air-intake passage 3 (see FIG. 2) formed within an air-intake pipe 10 and a fuel injector 1 having an injection nozzle configured to inject a fuel into the air-intake passage 3 so that a fuel-air mixture is supplied to a cylinder 19.

As shown in FIG. 2, the fuel injector 1 is communicatively coupled to a fuel injection controller 2 through a signal line L1. Based on control by the fuel injection controller 2, a fuel supply valve (not shown) disposed within the fuel injector 1 operates to inject a desired amount of fuel at desired timings.

The fuel injector 1 is coupled to a fuel tank T via a fuel feed pipe 5 and a fuel feed pump P, and is configured to be fed with a desired amount of fuel from the fuel tank T at desired times.

A pressure sensor 4, which is one type of a fluid energy amount detecting device, is attached on the air-intake passage 3 at a location downstream of a throttle valve 7 in a flow direction of intake-air in the engine E. The pressure sensor 4 is communicatively coupled to the fuel injection controller 2 through a signal line L4 and is configured to detect an air-intake pressure in an interior of the air-intake passage 3 and send it to the fuel injection controller 2.

An engine speed sensor 6 is arranged in the vicinity of a crankshaft (not shown) of the engine E. The engine speed sensor 6 is communicatively coupled to the fuel injection controller 2 through a signal line L6, and is configured to detect the engine speed of the engine E and send it to the fuel injection controller 2.

A throttle position sensor 8 is attached on a rotational shaft 7_a_ of the throttle valve 7 rotatably disposed within the air-intake passage 3. The throttle position sensor 8 is communicatively coupled to the fuel injection controller 2 through a signal line L8, and is configured to detect an opening degree of the throttle valve 7 and send it to the fuel injection controller 2. In a case where the throttle valve 7 is slidable in a direction perpendicular to a longitudinal direction of the air-intake passage 3 to substantially open and close the air-intake passage 3, a throttle position sensor configured to detect a movement amount in the sliding direction of the throttle valve 7 may be used.

A water temperature sensor 9 is disposed within a water jacket 18 formed in the engine E. The water temperature sensor 9 is communicatively coupled to the fuel injection controller 2 through a signal line L9 and is configured to detect a water temperature of a coolant of the engine E and send it to the fuel injection controller 2.

The fuel injection controller 2 includes a processing unit 2A configured to perform calculations described later, and a memory 2B coupled to the processing unit 2A through a signal line. The memory 2B contains programs such as a start-time fuel injection amount determination program, a base fuel injection amount determination control program, a compensation control program, which are run by the processing unit 2A, a start-time fuel injection map, a fuel injection amount calculation base map, an air-intake amount calculation map, etc. Within the fuel injection controller 2, a control process shown in FIG. 13 is executed.

Figure 3:
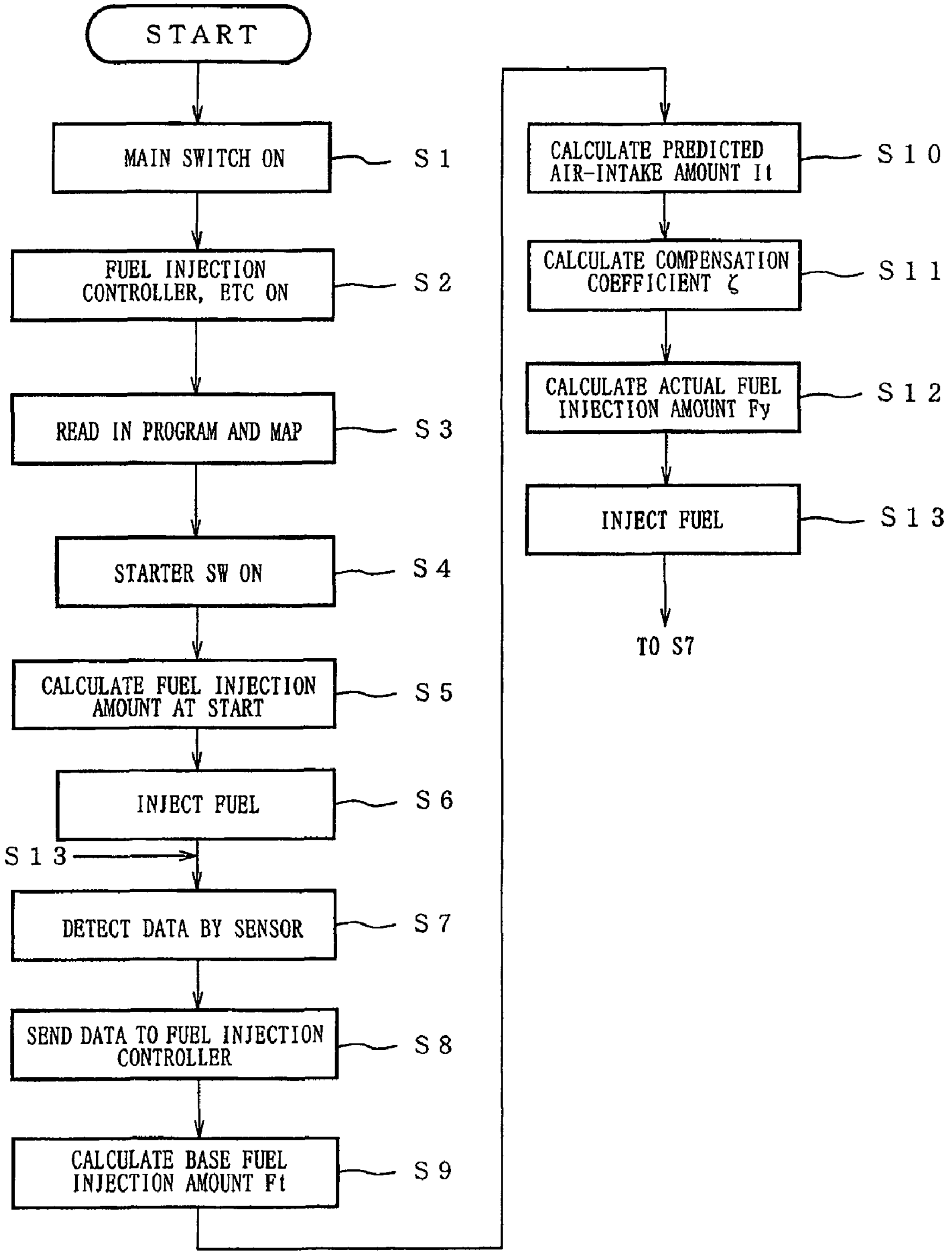
FIG. 3 is a flowchart showing a series of control processes for determining a fuel injection amount of the engine of FIG. 2 and injecting a fuel of the determined fuel injection amount.
Figure 13:
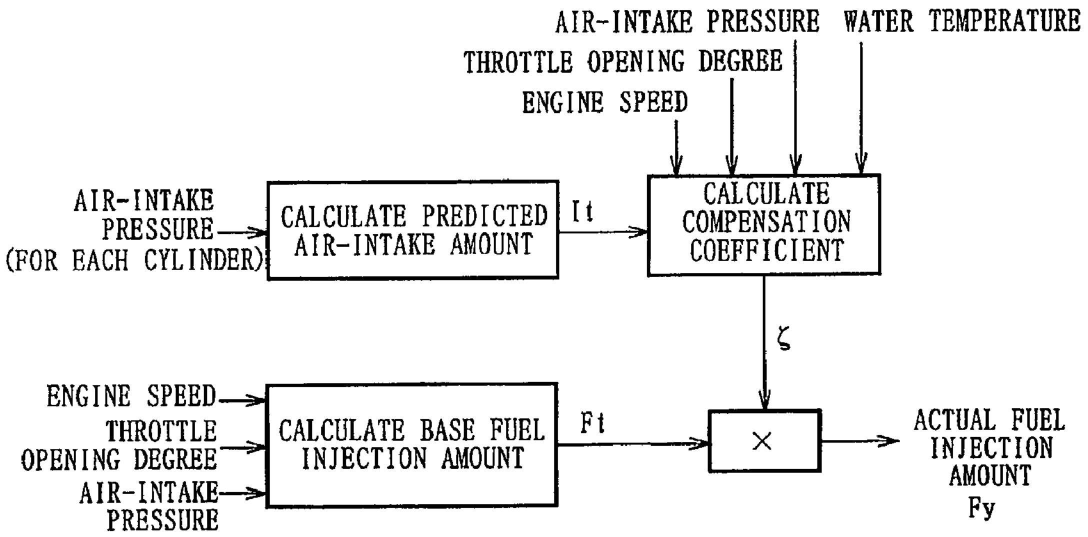
FIG. 13 is a block diagram showing a configuration of compensation control based on the predicted air-intake amount obtained from the air-intake pressure of each of the cylinders of the engine of FIG. 2.

In the above configured engine E, prior to feeding the fuel to the cylinder 19, the actual fuel injection amount is determined based on a control logic shown in FIG. 13. As described in detail later, first, a predicted air-intake amount, It, which will be fed to the cylinder 19 in a next intake stroke, is calculated. Using the predicted air-intake amount It, a compensation value (compensation coefficient $\zeta$ in this embodiment) for the base fuel injection amount Ft found from the throttle opening degree and others, is calculated. Then, the actual fuel injection amount is calculated by multiplying the base fuel injection amount Ft by the compensation coefficient $\zeta$. Hereinbelow, an estimation method of the air-intake amount and the control process for feeding the fuel, and the like, considering the amount of fuel adhering to the wall surface of the air-intake passage 3, will be described with reference to a flowchart of FIG. 3.

When a rider turns on a main switch of the motorcycle A (step 1: S1), the fuel injection controller 2, the pressure sensor 4, the engine speed sensor 6, the throttle position sensor 8, the water temperature sensor 9, and others are turned on (step 2: S2). The sensors 4, 6, 8, and 9 detect data and send them to the fuel injection controller 2, and the processing unit 2A of the fuel injection controller 2 suitably reads in the programs such as the start-time fuel injection amount determination program, the base fuel injection amount determination control program, and the compensation control program, the start-time fuel injection map, the fuel injection amount calculation base map, the air-intake amount calculation map, etc. (step 3: S3).

In this state, when the rider presses a starter button (not shown) (step 4: S4), the processing unit 2A of the fuel injection controller 2 calculates a start-time fuel injection amount with reference to the start-time fuel injection map using data associated with the detected water temperature, the detected throttle opening degree or the like, and the start-time fuel injection amount determination program (step 5: S5), and controls the fuel injector 1 to inject the fuel of the calculated amount (step 6: S6). Thus, the engine E starts.

When the engine E has started through the above described procedure, the pressure sensor 4 detects a value of the pressure in an interior of the air-intake passage 3, the engine speed sensor 6 detects the engine speed of the engine E, the throttle position sensor 8 detects the opening degree of the throttle valve 7, and the water temperature sensor 9 detects the water temperature of the coolant in the water jacket 18 of the engine E (step 7: S7). The detected data are sent to the fuel injection controller 2 through the signal lines L1 to L9 (step 8: S8).

Figure 15:
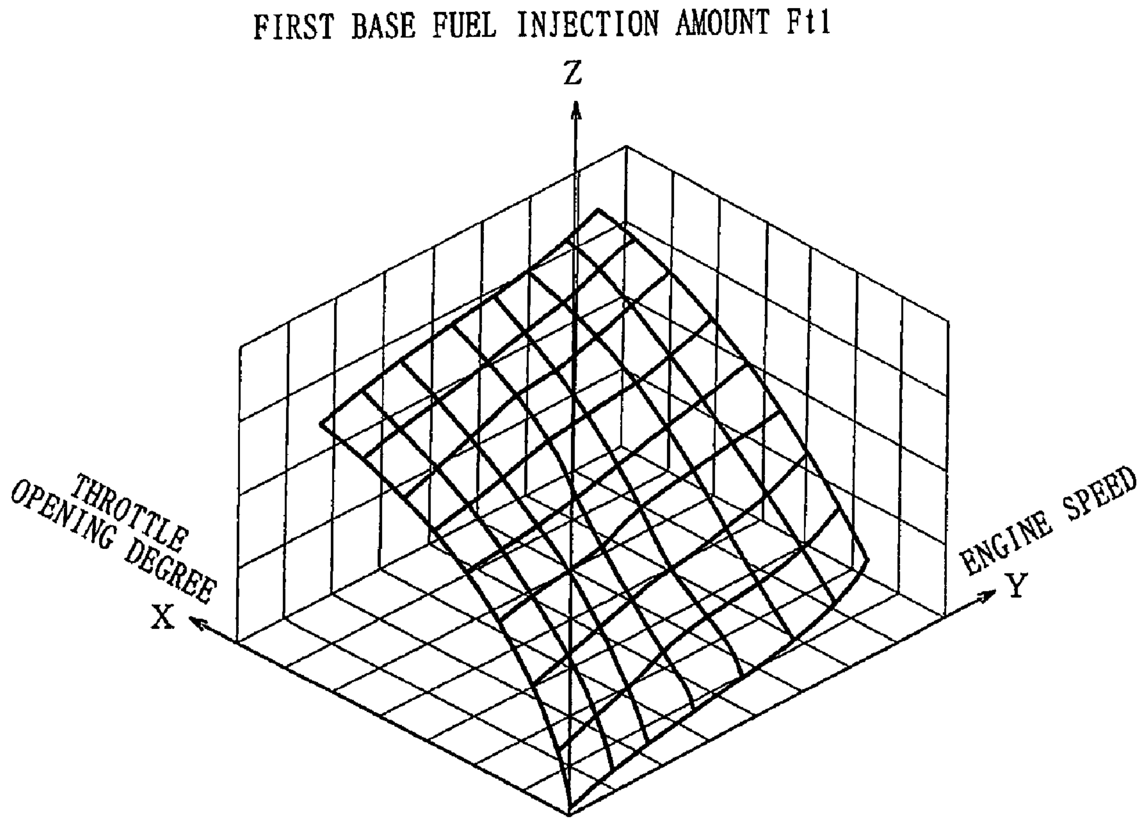
FIG. 15 is a view of a three-dimensional map showing a correlation between a first base fuel injection amount which is a part of the base fuel injection amount in FIGS. 13 and 14, the throttle opening degree, and the engine speed, to calculate the base fuel injection amount.
Figure 16:
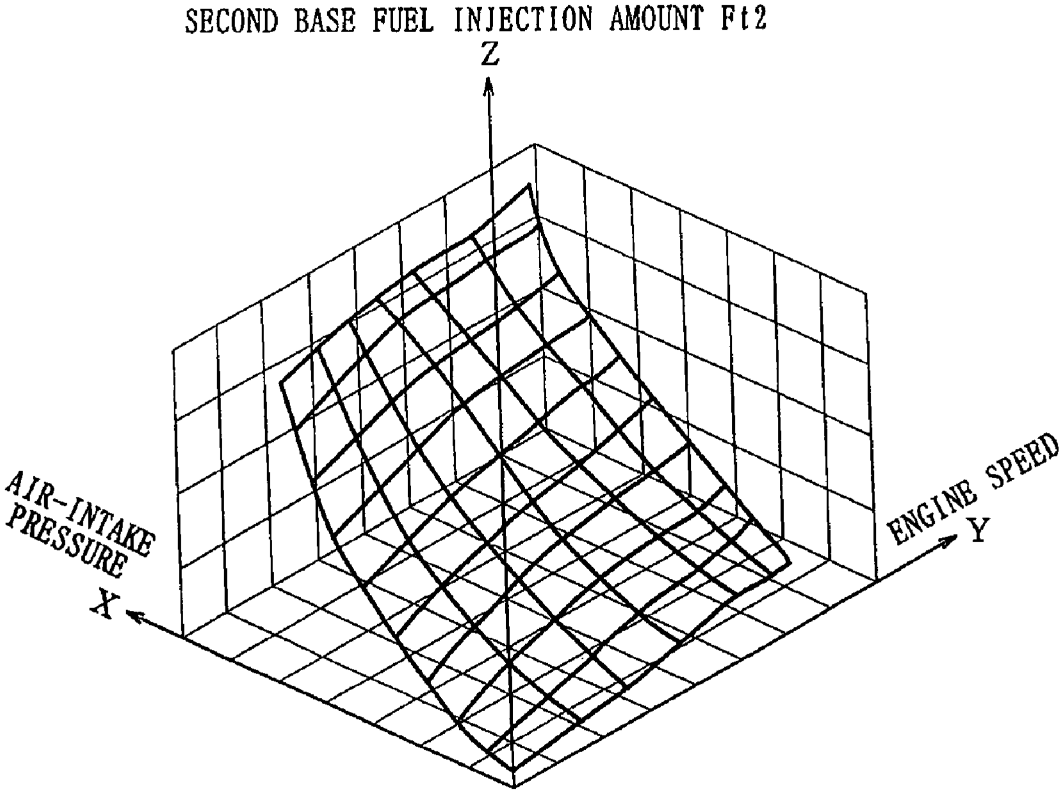
FIG. 16 is a view of a three-dimensional map showing a correlation between a second fuel injection amount which is another part of the base fuel injection amount in FIGS. 13 and 14, the air-intake pressure, and the engine speed, to calculate the base fuel injection amount.

Receiving the data, in the fuel injection controller 2, the processing unit 2A runs the base fuel injection amount determination control program using the fuel injection amount calculation base map and the air-intake amount calculation map that have been stored in the memory 2B and read out, and the detected data, and then calculates the base fuel injection amount Ft (step 9: S9). The calculation of the base fuel injection amount Ft is executed as follows. As shown in FIG. 15, a three-dimensional map indicating a correlation between the throttle opening degree on the X-axis, the engine speed on the Y-axis and a first base fuel injection amount Ft1 on the Z-axis is pre-created, and the first fuel injection amount Ft1 at that point of time is calculated based on the value of the corresponding engine speed and the value of the corresponding throttle opening degree. In addition, as shown in FIG. 16, a three-dimensional map indicating a correlation between the air-intake pressure on X-axis, the engine speed on Y-axis, and a second base fuel injection amount Ft2 on the Z-axis is pre-created, and the second fuel injection amount Ft2 at that point of time is calculated based on the value of the engine speed and the value of the air-intake pressure at that point in time.

Figure 17:
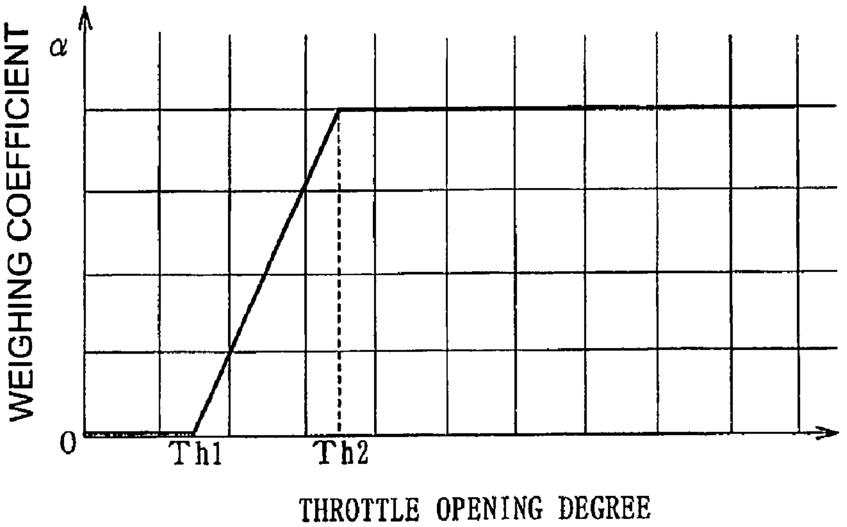
FIG. 17 is a view showing the throttle opening degree and a weighing coefficient α, to calculate the base fuel injection amount using the first base fuel injection amount and the second base fuel injection amount in FIGS. 15 and 16.

Then, the base fuel injection amount Ft is calculated based on the value of the first base fuel injection amount Ft1 and the value of the second fuel injection amount Ft2, and by using a formula (1) and a determination map of a weighing coefficient $\alpha$ shown in FIG. 17. The weighing coefficient $\alpha$ is determined based on the throttle opening degree. As shown in FIG. 17, the weighing coefficient $\alpha$ is zero in a range in which the throttle opening degree increases from zero to a first opening degree value Th1, and increases in a linear function form in proportion to the magnitude of the throttle opening degree in a range in which the throttle opening degree increases from the first opening degree value Th1 to a second opening degree value Th2. After the throttle opening degree has reached the second opening degree value Th2, the weighing coefficient $\alpha$ is constant even though the throttle opening degree increases. It should be noted that the maps shown in FIGS. 15 to 17 are pre-created in view of factors such as a power output of the engine E to be obtained, corresponding to each engine speed of the internal combustion engine E.

$$Ft=\alpha\times Ft1+(1-\alpha)\times Ft2 \qquad (1)$$

Figure 4:
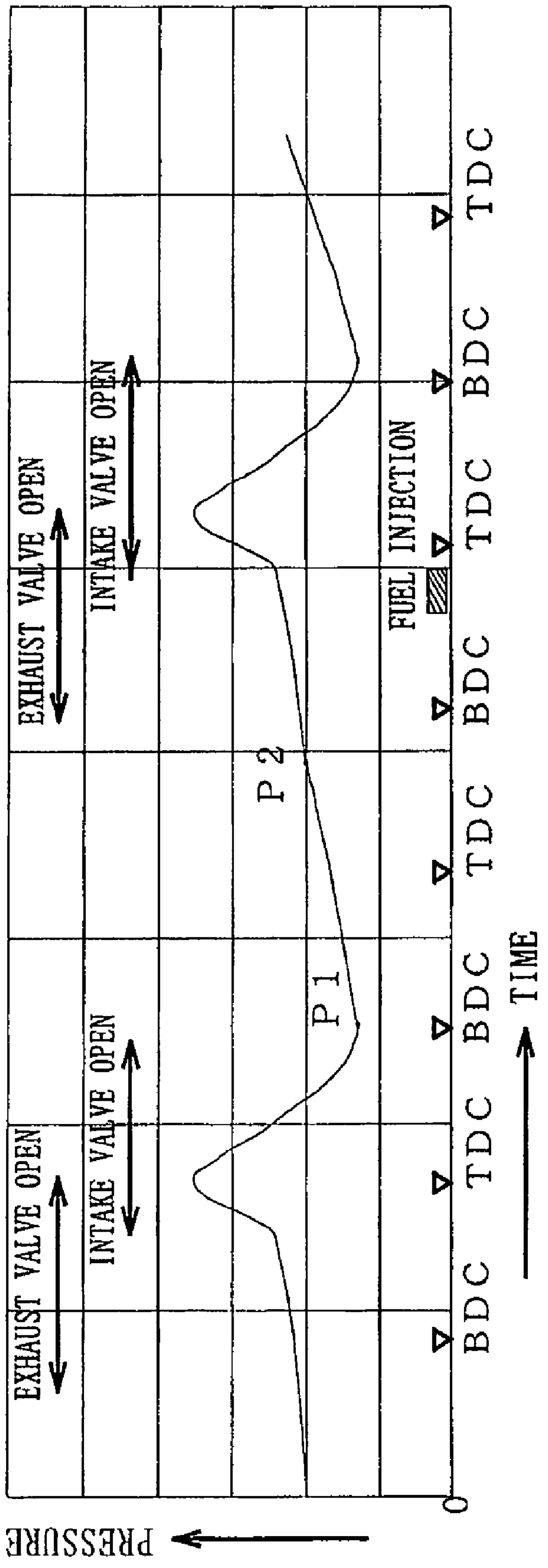
FIG. 4 is a graph showing two points that are apart in time from each other in a period of a cycle during which an intake valve corresponding to a cylinder to which the fuel is fed is closed, in which a vertical axis indicates a value of an air-intake pressure within an air-intake passage, and a horizontal axis indicates time.

The pressure sensor 4 gains data P1 and P2 in FIG. 4 relating to pressure values at two points that are apart in time from each other in a period during which an intake valve 21 (see FIG. 2) is closed, from the compression stroke to the exhaust stroke in one cycle of the cylinder 19 in which the fuel is to be injected, and the pressure (fluid energy amount) in the interior of the air-intake passage 3 is varied simply. For example, as shown in FIG. 4, the two points are a first point that is a start point near a bottom dead center of start of the compression stroke of the internal combustion engine, and a second point that is subsequent to and apart in time from the first point, for example, apart with a crank angle of about 360 degrees and before a bottom dead center of the expansion stroke of the internal combustion engine. The data P1 and P2 are read in the fuel injection controller 2. The fuel injection controller 2 calculates the predicted air-intake amount It using the data P1 and P2 relating to the pressure values, and with reference to the air-intake amount calculation map showing a relationship between the pressure values (value in the X-axis direction and value in the Y-axis direction in FIG. 5) at the two points and the predicted air-intake amount (value in the Z-axis direction in FIG. 5) (step 10: S10). How the predicted air-intake amount It is calculated will be described in detail later.

Subsequently, the compensation value (in this embodiment the compensation coefficient ζ) used for executing the compensation control with respect to the base fuel injection amount Ft is calculated using the predicted air-intake amount It (step 11: S11). In this embodiment, the compensation control is carried out by multiplying the base fuel injection amount Ft by the compensation coefficient ζ. To this end, the compensation coefficient ζ is calculated as follows. First, a desired fuel feed amount Q is calculated from the predicted air-intake amount It and an optimal (theoretic or stoichiometric) air-fuel ratio ϵ according to a formula Q=It×1/ϵ. Then, a fuel injection amount Fx of the fuel to be injected that is represented by a formula (2) is calculated based from the desired fuel injection amount Q and based on a control logic of a wall surface adhesion reverse model of FIG. 23 that is derived from a wall surface adhesion model of FIG. 22. Then, the desired fuel feed amount Q is divided by the fuel injection amount Fx to obtain the compensation coefficient ζ (ζ=Q/Fx).

$$Fx=(Q-B\times W(n-1))/A \qquad (2).$$

W (n−1) in the formula (2) is represented by a formula (3):

$$W(n-1)=((1-A)\times Q-W(n))/(1-B) \qquad (3)$$

Figure 22:
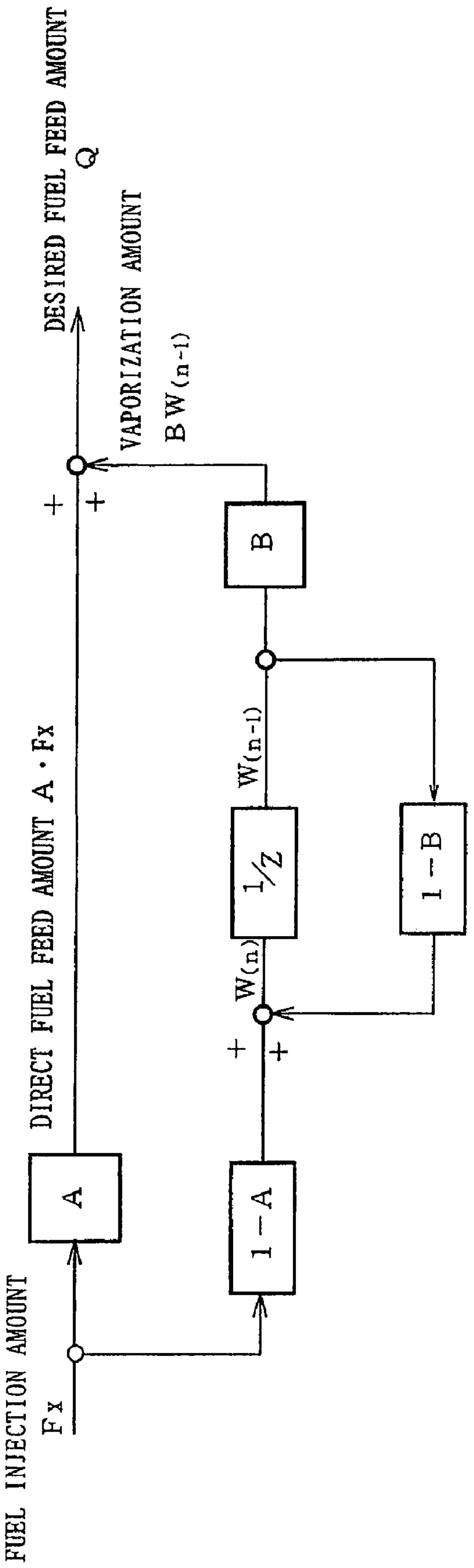
FIG. 22 is a block diagram showing a wall surface adhesion model indicating a desired fuel feed amount with respect to the fuel injection amount.
Figure 23:
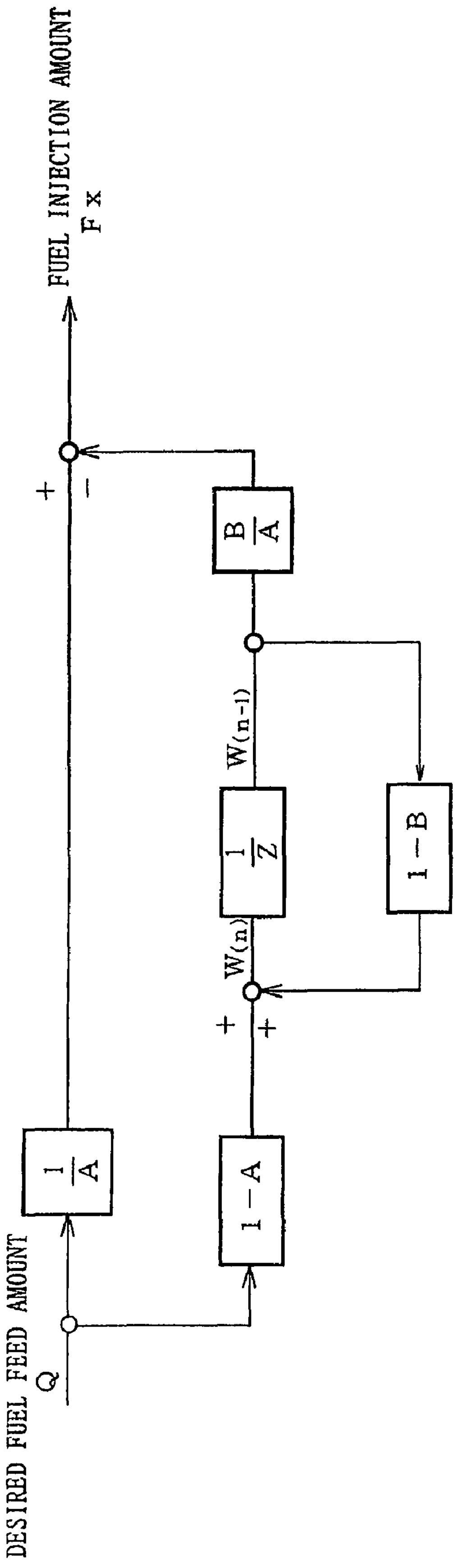
FIG. 23 is a block diagram showing a wall surface adhesion reverse model indicating the fuel injection amount with respect to the fuel feed amount.

In FIGS. 22 and 23, A indicates a ratio of a fuel directly fed to the cylinder 19 to the fuel injection amount Fx, 1−A indicates a ratio of the fuel adhering onto the wall surface of the air-intake passage 3 to the fuel injection amount Fx, 1/Z indicates a delay factor, W(n) indicates an amount of fuel adhering onto the wall surface, W (n−1) indicates an amount of the fuel obtained by multiplying the amount of fuel adhering onto the wall surface by the delay factor 1/Z, B indicates a vaporization ratio of the fuel vaporized to the fuel adhering onto the wall surface of the air-intake passage 3, and 1−B indicates a ratio of the fuel staying unvaporized to the fuel adhering onto the walk surface of the air-intake passage 3. The ratio A of the fuel and the vaporization ratio B may be found based on any one of the engine speed, the throttle opening degree, the air-intake pressure, and the water temperature of the engine E.

Subsequently, as shown in FIG. 13, the base fuel injection amount Ft found in the above calculation is multiplied by the compensation coefficient ζ to obtain the actual fuel injection amount Fy (Fy=Ft×ζ) of the fuel to be injected in the intake stroke (step 12: S12).

Then, the fuel of the fuel injection amount Fy calculated above is injected from the fuel injector 1 (step 13: S13).

The steps S7 through S13 are repeated for each cylinder and in each cycle (or in each set of plural cycles) so that an optimal amount of fuel according to the running state of the engine is fed to the cylinder 19. As a result, as indicated by a solid line in FIG. 11, in the acceleration state, acceleration smoothly occurs with less time lag in response to the rider's throttle operation, and a favorable air-fuel ratio is obtained, while as indicated by a solid line in FIG. 12, in the deceleration state, deceleration smoothly occurs with less time lag in response to the throttle operation, and a favorable air-fuel ratio is obtained.

Figure 11:
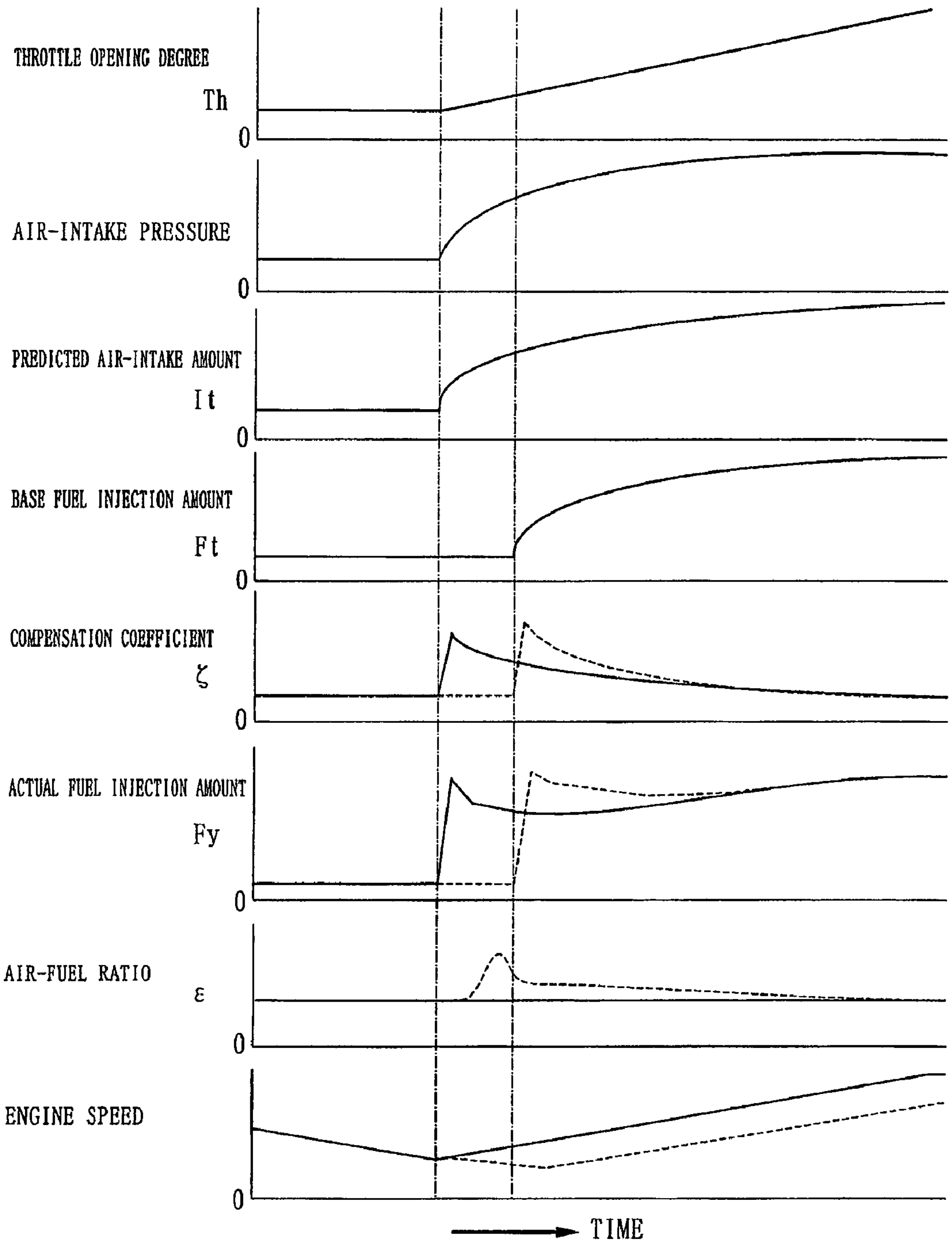
FIG. 11 is a view showing a control process and its results in an acceleration state of the engine of FIG. 2, in which the vertical axes indicate a throttle opening degree, an air-intake pressure, a predicted air-intake amount, a base fuel injection amount, a compensation coefficient value, a compensated actual fuel injection amount, an air-fuel ratio, and the engine speed, and the horizontal axis indicates time.

As a result, in the acceleration state as shown by the engine speed in FIG. 11, the air-fuel ratio is inhibited from increasing because of the lean fuel in the acceleration state, and the engine speed responds highly to the rider's throttle operation, in contrast to a conventional engine in which its air-fuel ratio and engine speed are indicated by broken lines.

Figure 12:
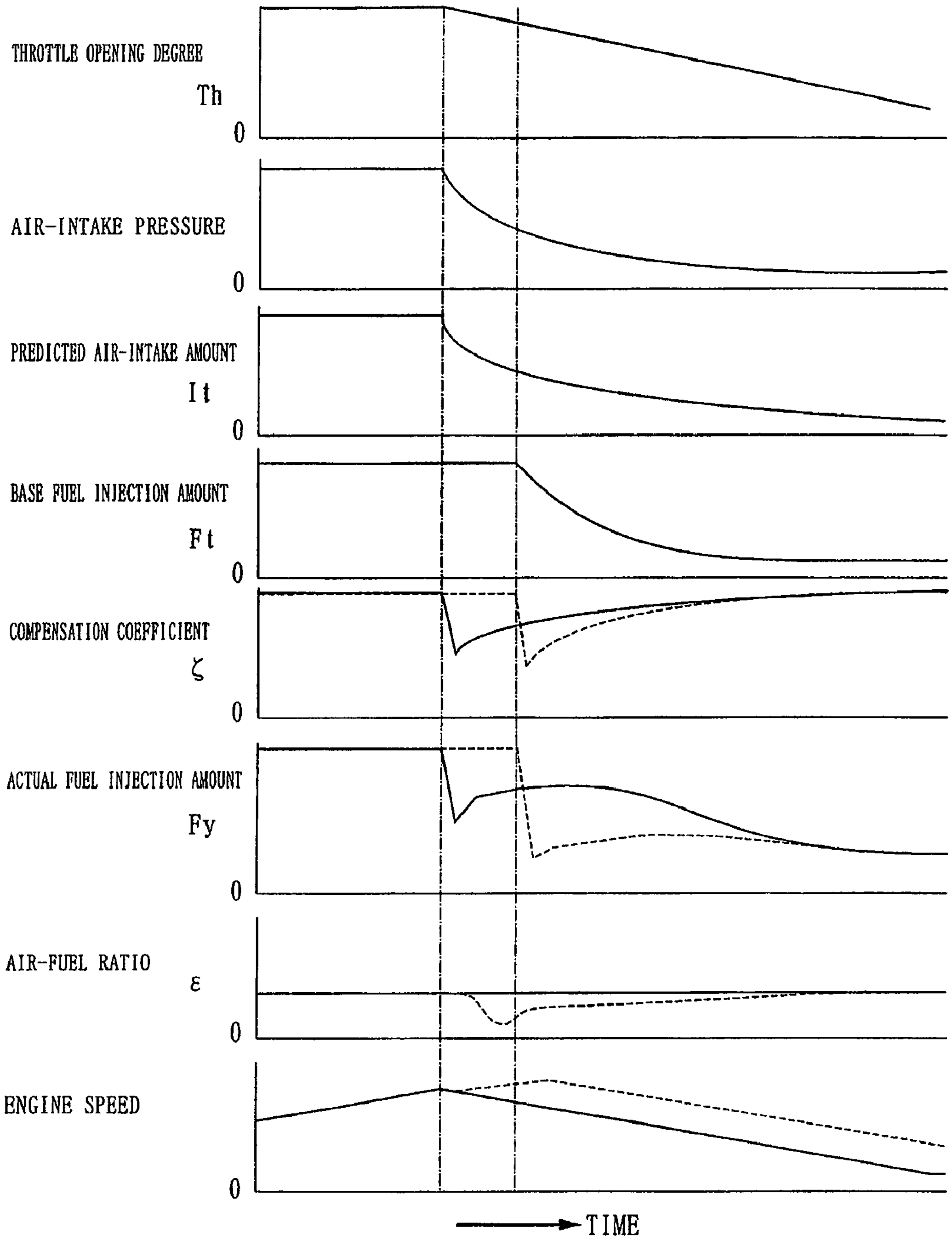
FIG. 12 is a view showing a control process and its results in a deceleration state of the engine of FIG. 2, in which the vertical axes indicate a throttle opening degree, an air-intake pressure, a predicted air-intake amount, a base fuel injection amount, a compensation coefficient value, a compensated actual fuel injection amount, an air-fuel ratio, and the engine speed, and the horizontal axis indicates time.

Also, in the acceleration state as shown by the engine speed in FIG. 12, in the deceleration state, the fuel is injected with an amount according to the deceleration state without a time lag, and the amount of the fuel does not cause an overly rich air-fuel ratio. As a result, in the deceleration state, the engine speed decreases to be highly responsive to the rider's throttle operation.

In FIGS. 11 and 12 showing the actual fuel injection amount Ft, a horizontal axis indicates time, and a vertical axis indicates a change of the actual fuel injection amount, Fy, injected in each cycle of the acceleration state (see FIG. 11) or the deceleration state (see FIG. 12).

Even if the base fuel injection map or the like is modified in a complicated manner for some reasons or other, the compensation value (compensation coefficient ζ) can be changed easily according to the change in the predicted air-intake amount It, and the like, because the compensation value is set independently of the complicated modification.

Figure 5:
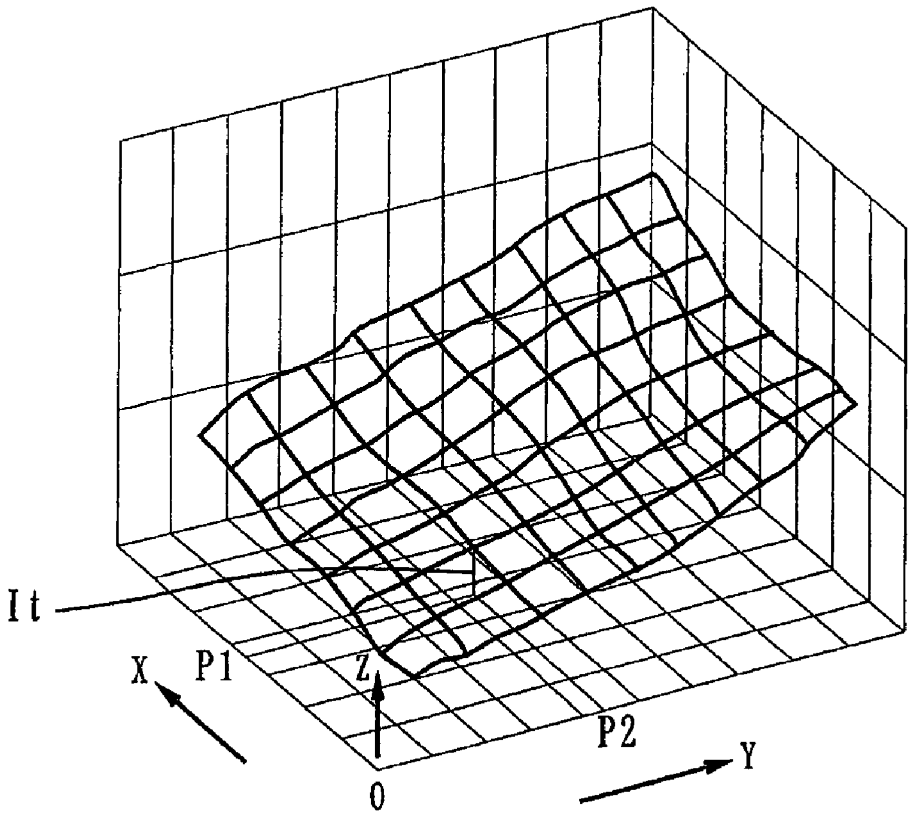
FIG. 5 is a view schematically showing an air-intake amount calculation map illustrating three-dimensionally a correlation between air-intake pressures at two points and a predicted air-intake amount, which are used in the control of FIG. 3.

FIG. 5 conceptually shows the air-intake amount calculation map used for calculating the predicted air-intake amount It using the data P1 and P2 relating to the pressure values at the two points that are sent from the pressure sensor 4. As described above, the two points are the first point near the bottom dead center of start of the compression stroke, and the second point that is subsequent to and apart from the first point, and near the bottom dead center of the expansion stroke at the end of the expansion stroke in the period during which the intake valve is closed from the compression stroke to the exhaust stroke in one cycle. The air-intake amount calculation map shown in FIG. 5 is such that data P1 and P2 of the pressures values at the two points are on the X-axis and on the Y-axis, the predicted air-intake amount It is on the Z-axis, and a correlation between the data P1 and P2 is shown in the form of a three-dimensional map. The air-intake amount calculation map is pre-created by measuring the pressure values at the two points of the air-intake passage 3 that correspond to the several air-intake amounts.

By detecting the data P1 and P2 of the pressure values at the two points in each cycle or in each set of plural cycles, and by reading the value of the predicted air-intake amount It that is shown on Z-axis at an intersection between the data P1 and P2, the predicted air-intake amount It can be found easily and quickly with reference to the map of FIG. 5. In FIG. 5, the predicted air-intake amounts It are shown by a mesh-like three-dimensional plane.

Figure 6:
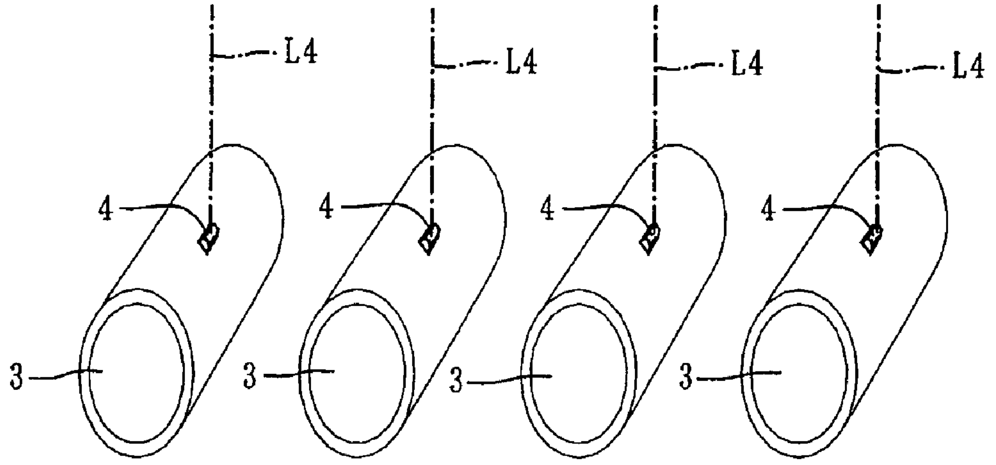
FIG. 6 is a view schematically showing an arrangement of air-intake passages corresponding to cylinders and pressure sensors attached therein in the engine of FIG. 2.
Figure 7:
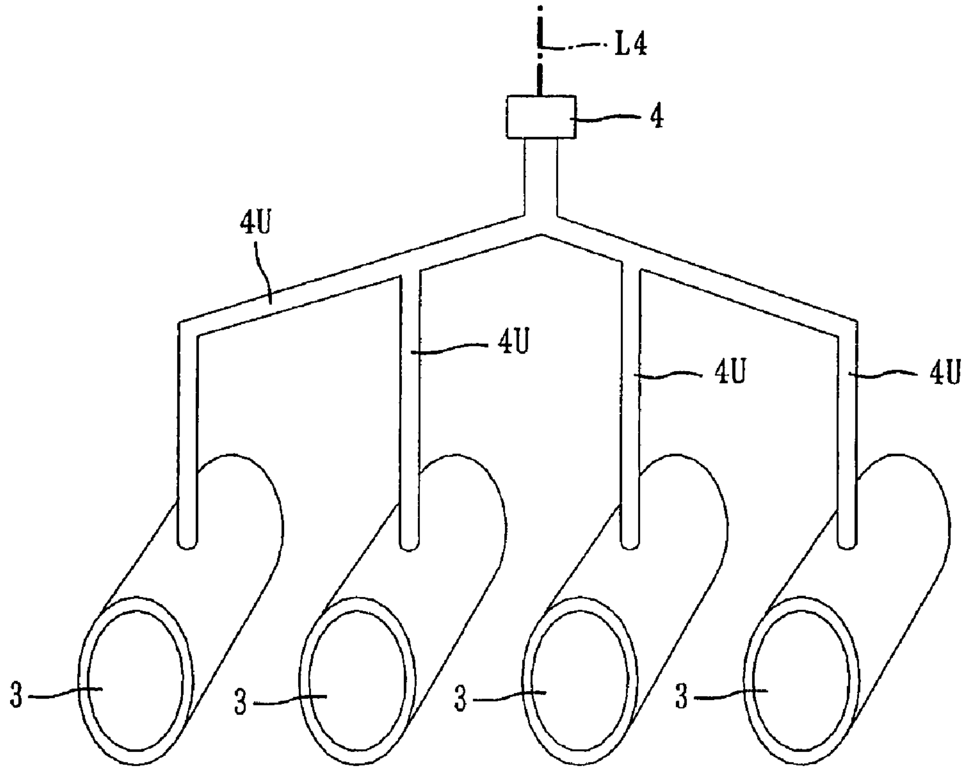
FIG. 7 is a view showing another arrangement of the air-intake passages corresponding to the cylinders and the pressure sensors therein.

As shown in FIG. 6, in this embodiment, four pressure sensors 4 are respectively attached on the air-intake passages 3 respectively corresponding to four cylinders, and are configured to send the detected data to the fuel injection controller 2 (see FIG. 2) through signal lines L4. Alternatively, as shown in FIG. 7, the pressure sensor 4 may be disposed at a merging point of pipes 4U extended from each of the air-intake passages 3.

Figure 8:
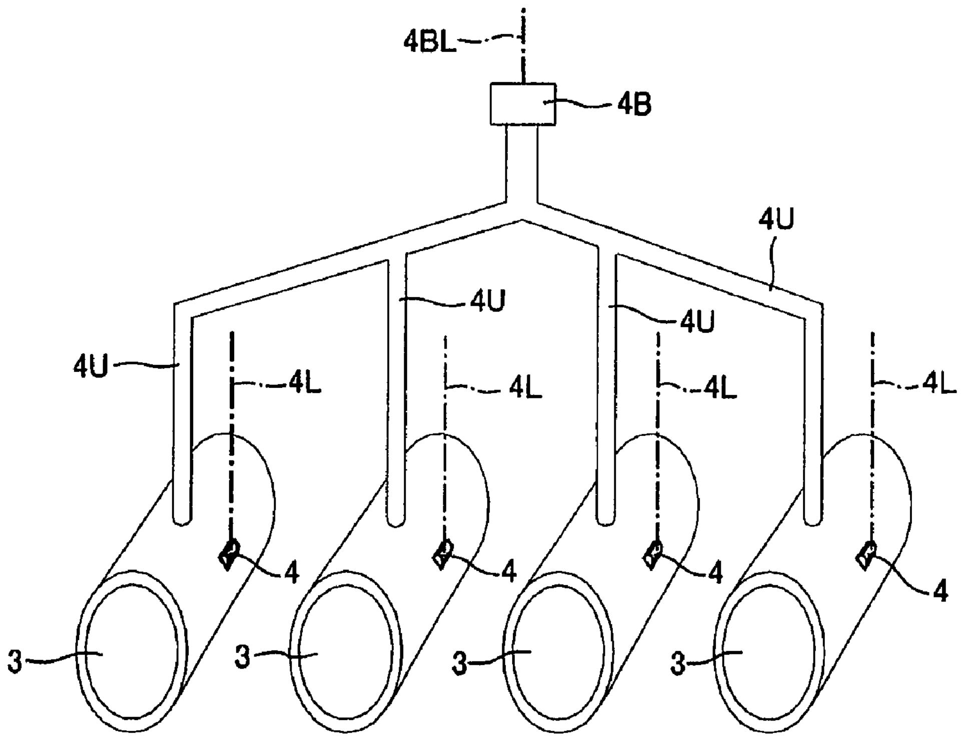
FIG. 8 is a view showing another arrangement of the air-intake passages corresponding to the cylinders and the pressure sensors.

In a further alternative, as shown in FIG. 8, the four pressure sensors 4 may be respectively attached on the air-intake passages 3 corresponding to the cylinders 5, and a pressure sensor 4B may be provided to detect an average value of the pressures of the air-intake passages 3 corresponding to the cylinders 5 and may be coupled to the air-intake passages 3 by the pipes 4U.

Figure 9:
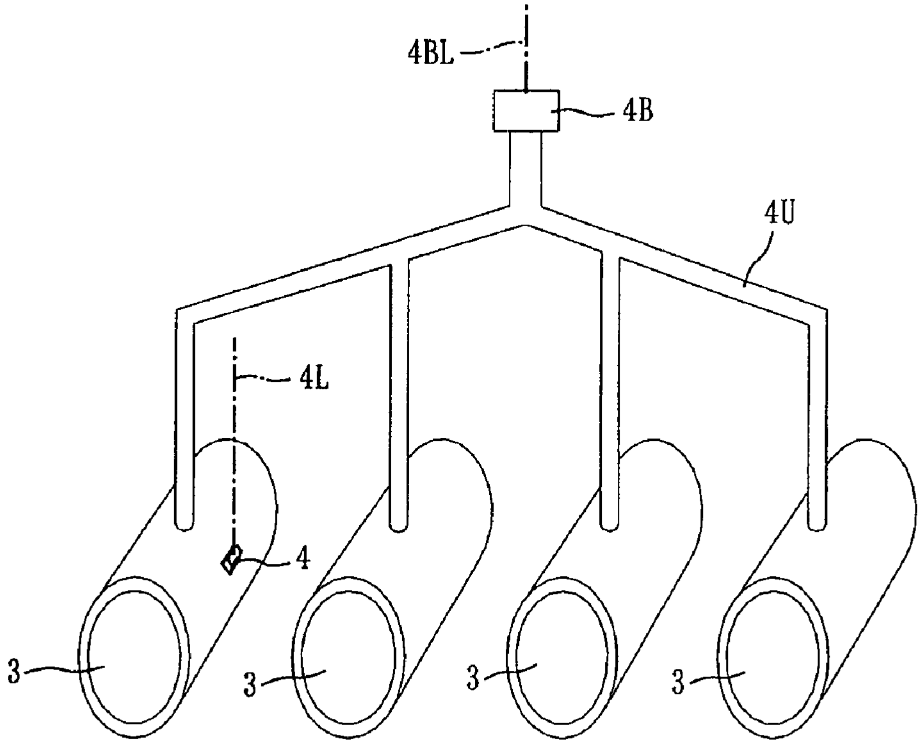
FIG. 9 is a view showing another arrangement of the air-intake passages corresponding to the cylinders and the pressure sensors.

In a further alternative, as shown in FIG. 9, one pressure sensor 4 may be attached on the air-intake passage 3 corresponding to one of the four cylinders 5 to detect the pressure of the air-intake passage 3, the pressure sensor 4B may be coupled to the air-intake passages 3 by the pipes 4U to detect an average value of the pressures of the air-intake passages 3 corresponding to the cylinders 5, which is used for calculating the base fuel injection amount Ft.

Figure 10:
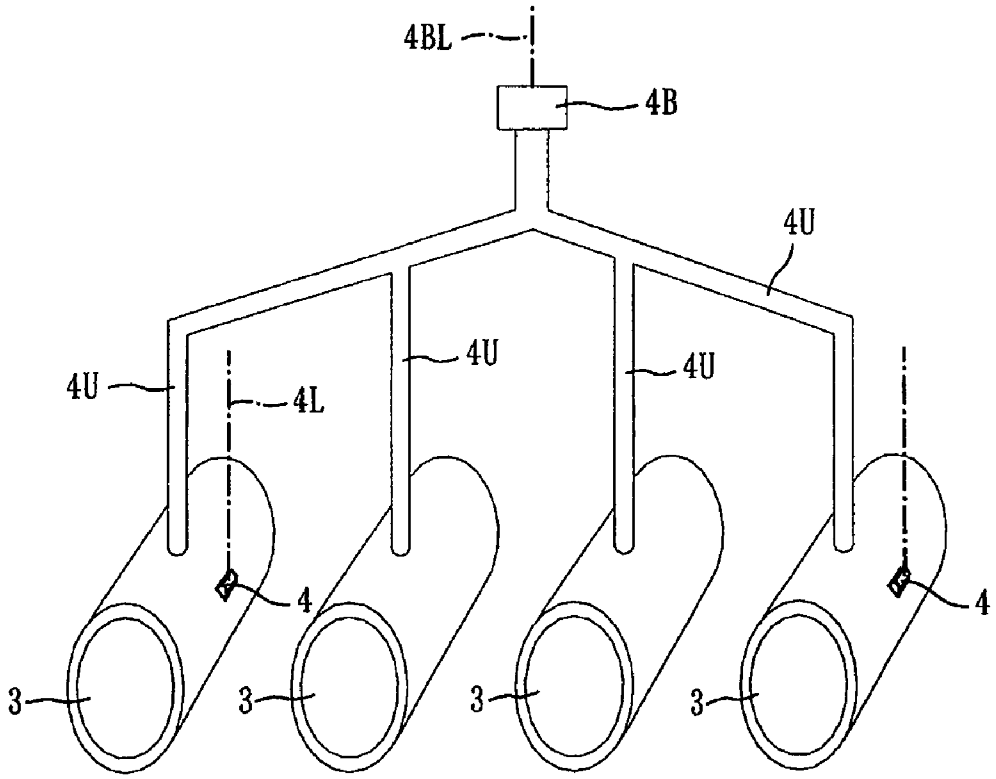
FIG. 10 is a view showing another arrangement of the air-intake passages of the cylinders and the pressure sensors.

In a further alternative, as shown in FIG. 10, two pressure sensors 4 may be attached on the air-intake passages 3 corresponding to two of the four cylinders 5 to detect the pressures of these air-intake pressures 3, and the pressure sensor 4B may be coupled to the air-intake passages 3 by the pipes 4U and may be configured to detect an average value of the pressures of the air-intake passages 3 that is used for calculating the base fuel injection amount Ft. In FIGS. 8 to 10, 4BL indicates a signal line through which the detected value is sent from the pressure sensor 4B to the fuel injection controller 2.

In the configuration shown in FIG. 7, one pressure sensor 4 is disposed at the merging point of the pipes 4U respectively extended from the air-intake passages 3 to detect the average pressure (average air-intake pressure) of the intake passages 3 corresponding to the cylinders 5, which is used for calculating the predicted air-intake amount It. The predicted air-intake amount It is calculated in a manner described below.

Figure 24:
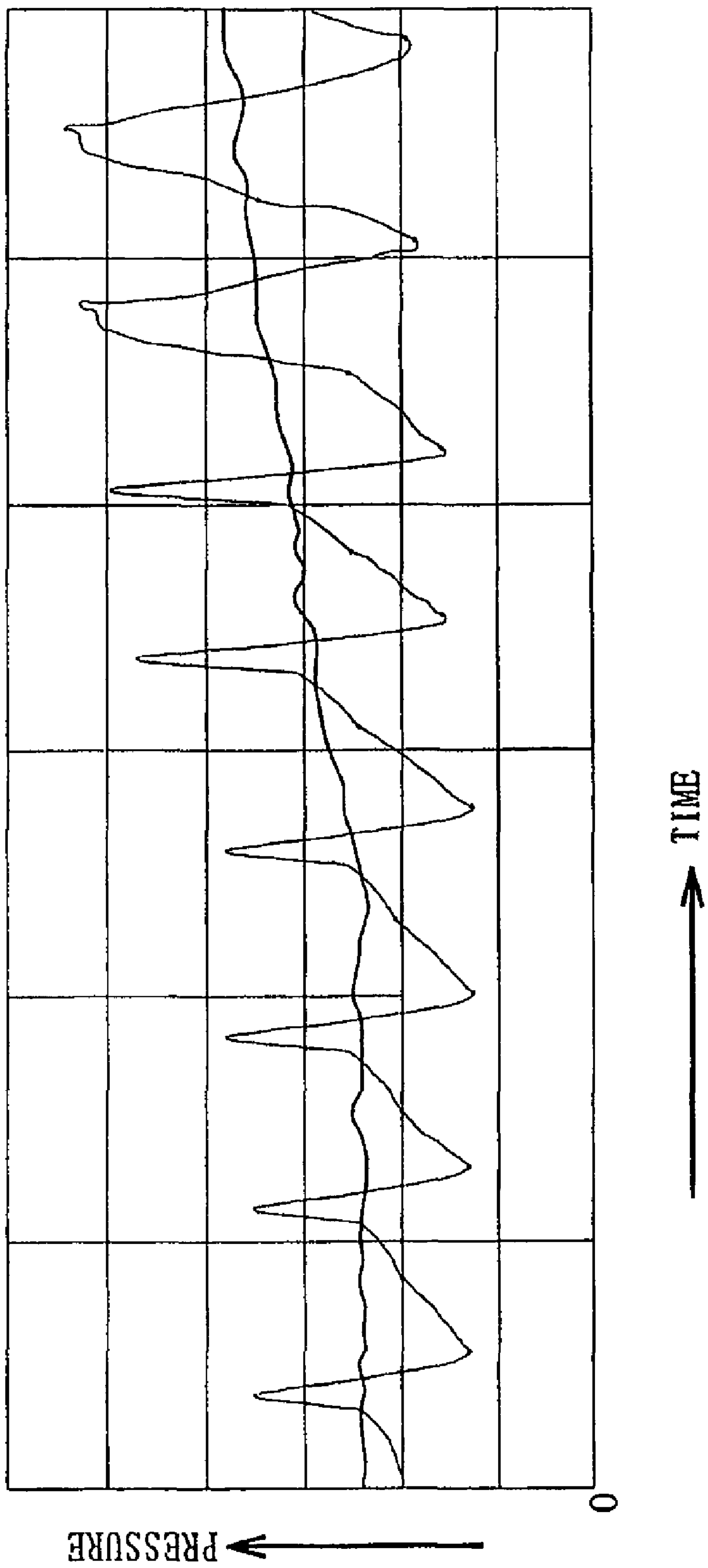
FIG. 24 is a view showing a change of the average air-intake pressure of the cylinders along with a change of the air-intake pressure of a first cylinder, in which vertical axis indicates the air-intake pressure within the air-intake passage, horizontal axis indicates time, a bold line indicates the change of the average air-intake pressure and a thin line indicates the change of the air-intake pressure of the first cylinder.

As shown in FIG. 24, the average pressure value does not substantially change as compared to a change in the pressure of the air-intake passage 3 of each cylinder. In this state, the predicted air-intake amount It cannot be obtained by measurement at the two points.

Figure 18:
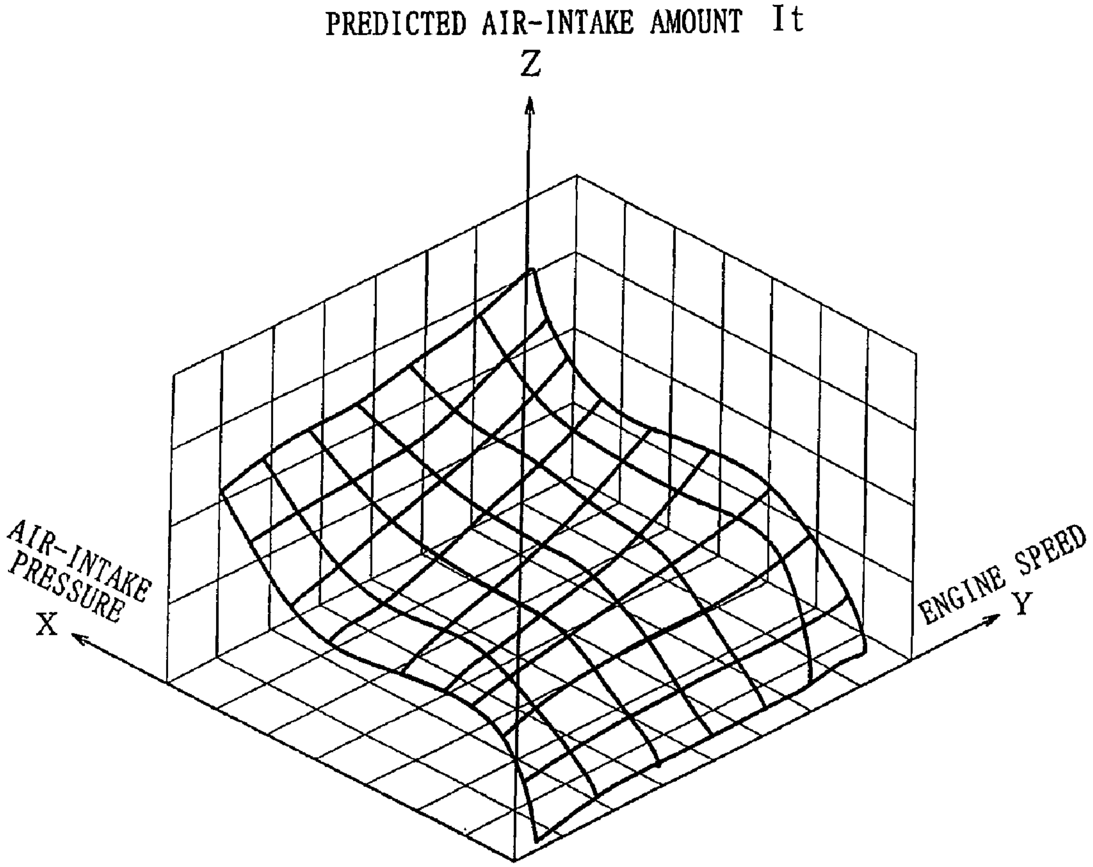
FIG. 18 is a view of a three-dimensional map showing a correlation between the air-intake pressure, the engine speed, and the predicted air-intake amount.

Accordingly, as shown in FIG. 18, a predicted air-intake amount calculation map is created with the average air-intake pressure on the X-axis, the engine speed on the Y-axis, and the predicted air-intake amount on the Z-axis. And, the value of the average air-intake pressure and the value of the engine speed at that point of time are obtained from the pressure sensor 4 and from the engine speed sensor 6, respectively, and the predicted air-intake amount, It, is calculated using those values and with reference to the map shown in FIG. 18.

Figure 14:
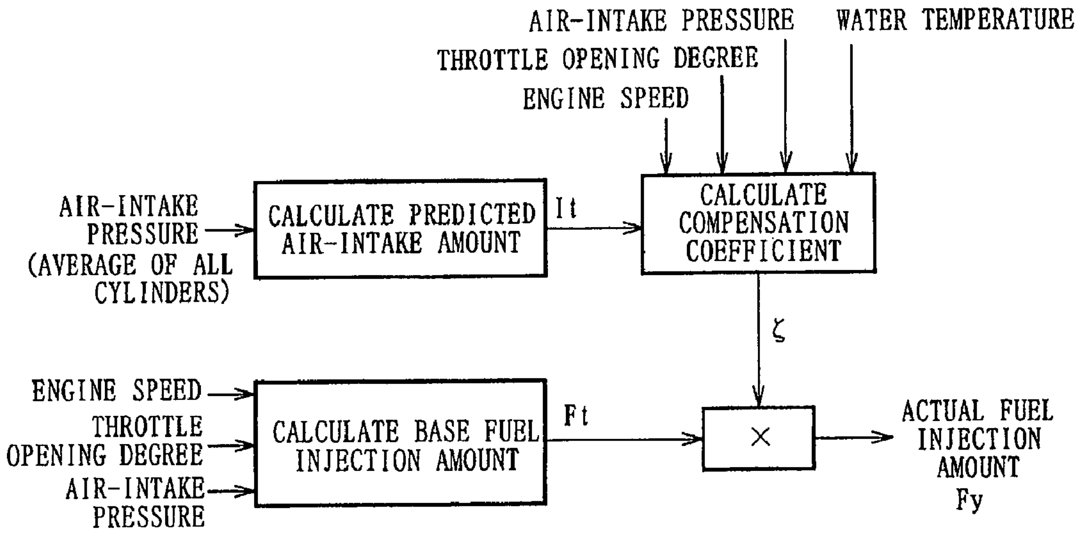
FIG. 14 is a block diagram showing a configuration of compensation control based on the predicted air-intake amount obtained from an average air-intake pressure of the cylinders of the engine of FIG. 2.

FIG. 14 schematically shows a configuration for calculating the actual fuel injection amount Fy using average air-intake pressure shown in FIG. 18. The configuration shown in FIG. 14 is substantially identical to the configuration shown in FIG. 13 except that, the average air-intake pressure value of the pressure sensors 14 is used, and will not be further described in detail. As should be appreciated, in this case, using the single pressure sensor 4, the predicted air-intake amount It can be calculated. Therefore, the estimating system can be configured simply and manufactured at a lower cost.

Figure 19:
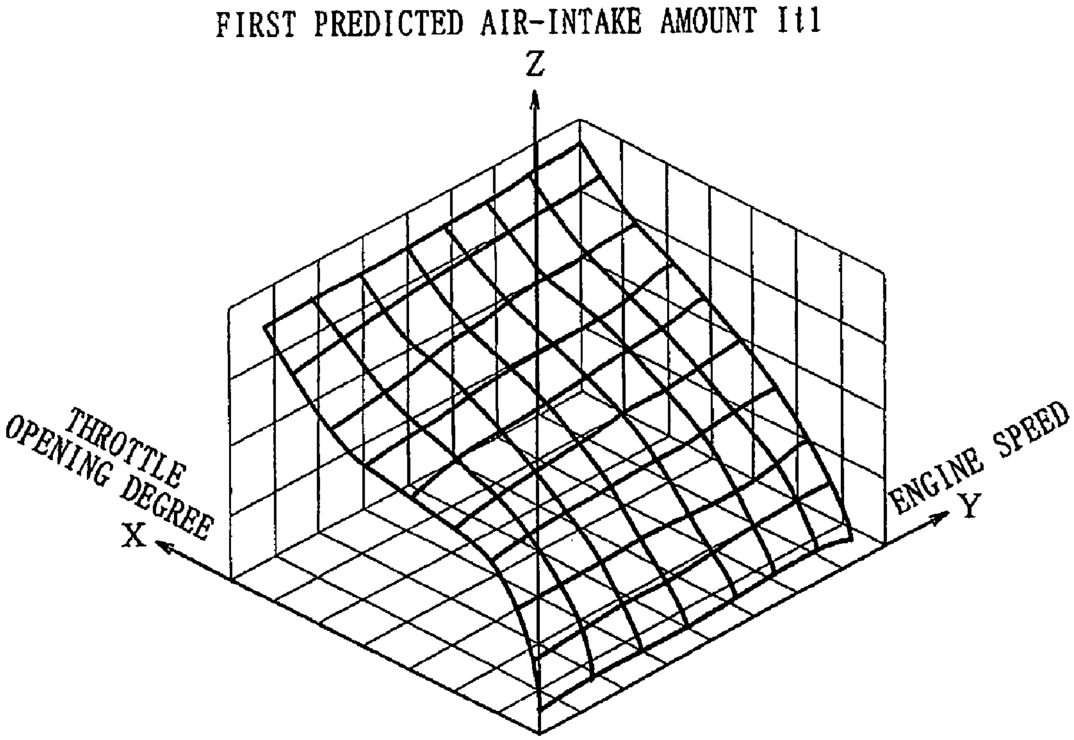
FIG. 19 is a view of a three-dimensional map showing a correlation between the throttle opening degree, the engine speed, and a first predicted air-intake amount, to calculate the predicted air-intake amount.
Figure 20:
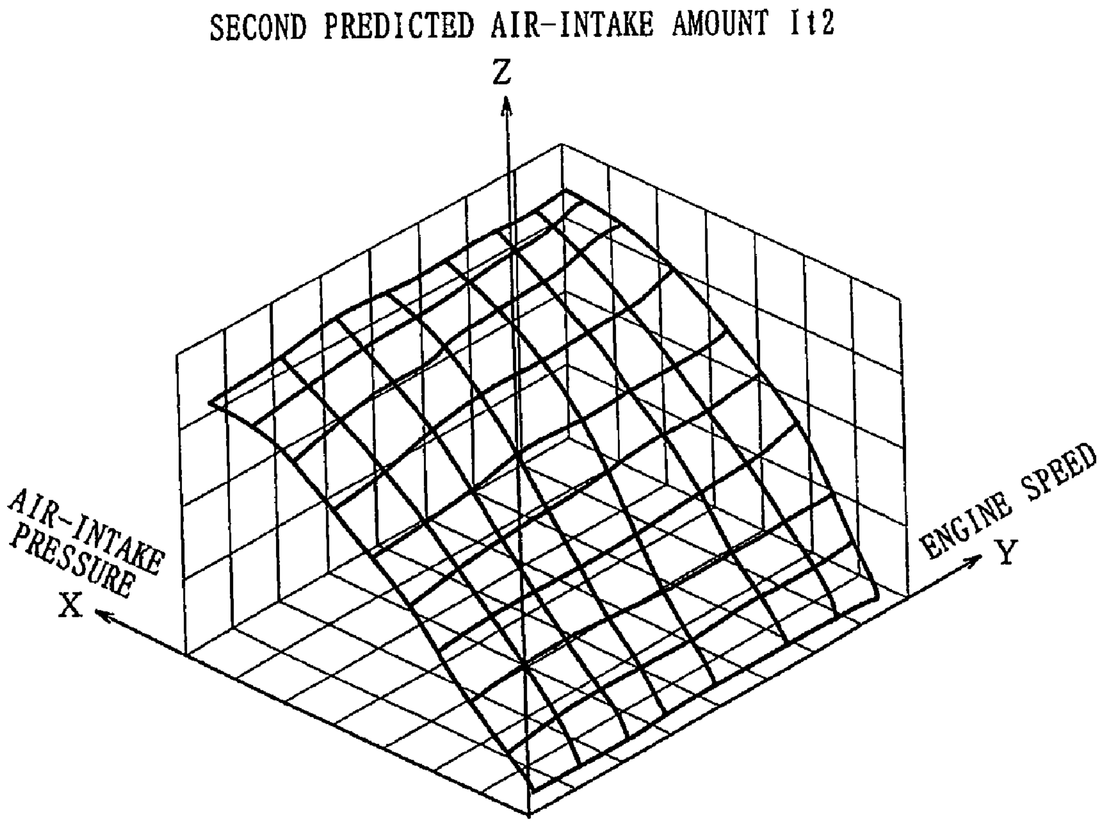
FIG. 20 is a view of a three-dimensional map showing a correlation between the air-intake pressure, the engine speed, and the second predicted air-intake amount, to calculate the predicted air-intake amount.

In this case, to calculate more precisely the predicted air-intake amount It, the values of the engine speed, the throttle opening degree, and the air-intake pressures maybe used as the parameters, as shown in FIG. 19, a first three-dimensional map which is a tilted curved plane map, showing a correlation between the throttle opening degree on the X-axis, the engine speed on the Y-axis, and the first predicted air-intake amount It1 on the Z-axis, is pre-created, and the value of the first predicted air-intake amount It1 at that point of time is calculated from the value of the throttle opening degree and the value of the corresponding engine speed with reference to the first three-dimensional map. In addition, as shown in FIG. 20, a second three-dimensional map which is a tilted curved plane map, showing a correlation between the air-intake pressure on the X-axis, the engine speed on the Y-axis, and a second predicted air-intake amount It2 on the Z-axis is pre-created, and the value of the second predicted air-intake amount It2 at that point of time is calculated from the value of the corresponding air-intake pressure and the value of the corresponding engine speed with reference to the second three-dimensional map.

Figure 21:
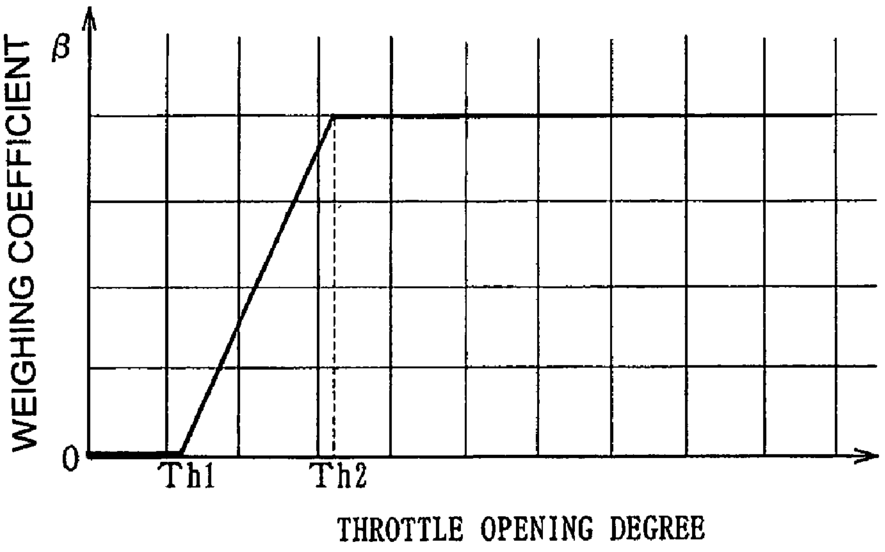
FIG. 21 is a view showing a correlation between the throttle opening degree and a weighing coefficient β to calculate the predicted air-intake amount using the first predicted air-intake amount and the second predicted air-intake amount in FIGS. 19 and 20.

Then, the final predicted air-intake amount It is calculated from the first predicted air-intake amount It1 and the second predicted air-intake amount It2, according to a formula (4) using a weighing coefficient, β. The weighing coefficient β is determined based on the throttle opening degree. To be specific, the weighing coefficient β is found based on a value of the corresponding throttle opening degree with reference to FIG. 21 showing a change in the value of the weighing coefficient β with respect to the throttle opening degree, with the throttle opening degree on the horizontal axis and the weighing coefficient β on the vertical axis. As shown in FIG. 21, the value of the weighing coefficient β is zero in a range in which the value of the throttle opening degree changes from zero to a first opening degree value Th1. The value of the weighing coefficient β increases in a linear function form in proportion to the magnitude of the throttle opening degree in a range in which the value of the throttle opening degree changes from the first opening degree value Th1 to a second opening degree value Th2. After the throttle opening degree has reached the second opening degree value Th2, the value of the weighing coefficient β is constant even though the value of the throttle opening degree increases. The graph shown in FIG. 21 is pre-found based on the desired output and the like of the engine speed in the internal combustion engine.

$$It=\beta\times It1+(1-B)\times It2 \quad (4)$$

Whereas in this embodiment, the predicted air-intake amount It is calculated based on the pressure in the interior of the air-intake passage 3, which is a fluid energy amount, it may alternatively be calculated based on a speed or a flow rate of the air-intake in the air-intake passage 3. To be specific, the speed of the air-intake in the air-intake passage 3 is obtained, and a relationship between the speed and the predicted air-intake amount It is pre-found in the form of a map or the like so that the predicted air-intake amount It is found from the speed. Or, the flow rate of air-intake in the air-intake passage 3 is obtained, and a relationship between the flow rate and the predicted air-intake amount It is found in the form of a map or the like so that the predicted air-intake amount It is found from the flow rate. Or, another sensor may be used to detect the fluid energy amount.

Whereas in this embodiment, the compensation coefficient ζ is used as the compensation value and the base fuel injection amount Ft is multiplied by the compensation coefficient ζ, a compensation amount may alternatively be found to be used for addition and subtraction with respect to the base fuel injection amount Ft. For example, when the predicted air-intake amount It is increased, the compensation amount is added to the fuel injection amount Fx to increase the fuel injection amount Fx, whereas when the predicted air-intake amount It is decreased, the compensation amount is subtracted from the fuel injection amount Fx to decrease the fuel injection amount Fx.

The predicted air-intake amount It, the compensation amount, or the base fuel injection amount Ft may be found by calculation using a control map such as the three-dimensional map as described above, or by calculation according to formulae. In general, it is desirable to find the base fuel injection amount Ft by the calculation using the control map such as the three-dimensional map, because precise setting or adjustment is realized under the conditions.

Whereas in this embodiment, the internal combustion engine mounted in the motorcycle has been described, the present invention may be applied to internal combustion engines mounted in an ATV (all terrain vehicle), personal watercraft (PWC), etc.

In FIG. 2, 22 denotes an exhaust valve disposed in the cylinder head 20, 24 denotes an air cleaner disposed in an upstream region of the air-intake passage 3, 25 denotes a piston slidably disposed within the cylinder 19 of the engine E, 28 denotes a combustion chamber of the cylinder 19 into which the air-fuel mixture from the air-intake passage 3 is suctioned, and 29 denotes an ignition plug. In FIG. 2, a drive mechanism for each valve and the like that is disposed within the cylinder head 20 is omitted.

Embodiment 2

Figure 25:
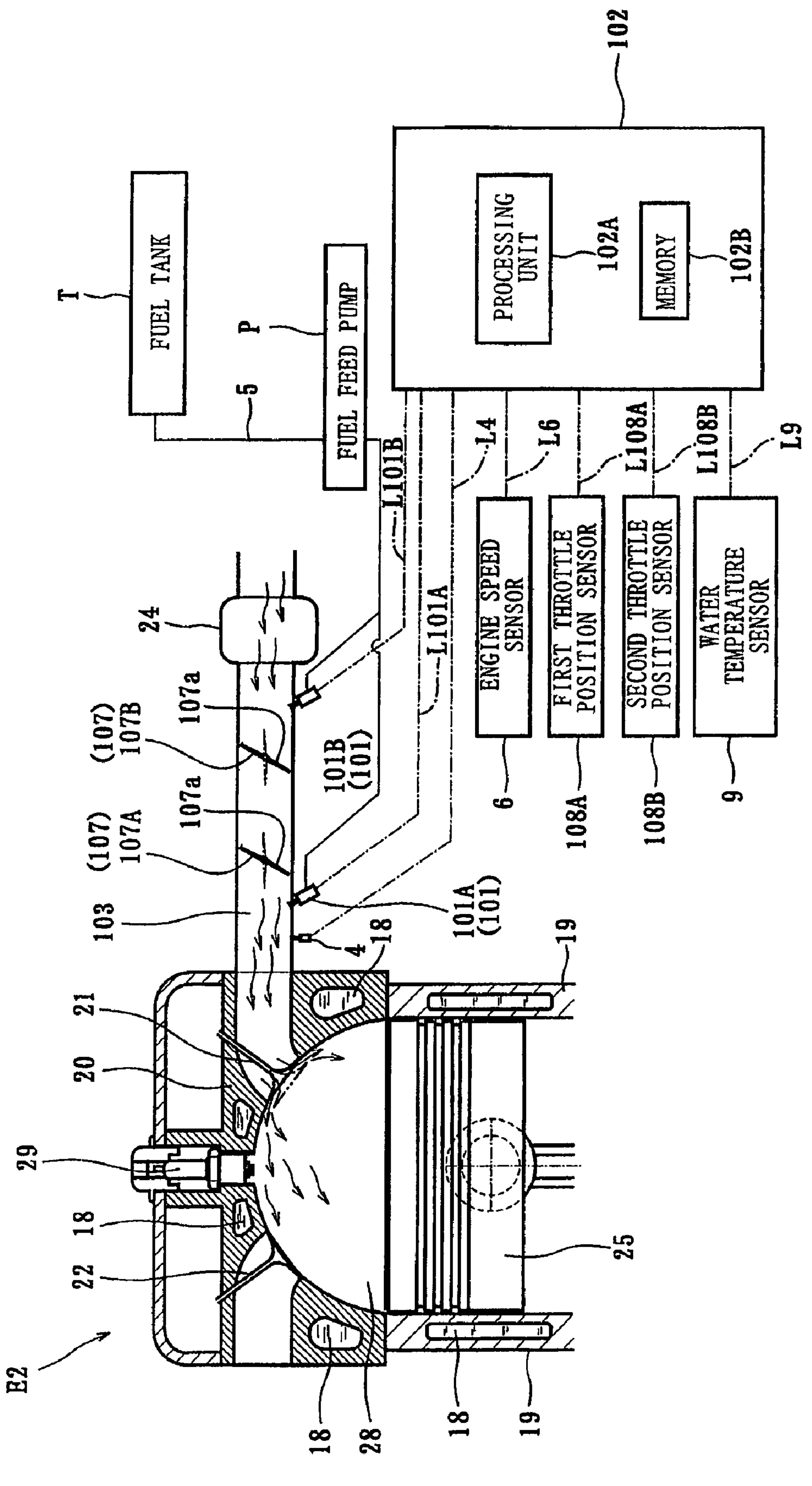
FIG. 25 is a block diagram schematically showing a substantial part of another multi-cylinder engine equipped in the motorcycle of FIG. 1.

In the first embodiment, the fuel injector 1 is disposed for each of the air-intake passages 3, while an engine E2 of a second embodiment has a twin injector configuration, in which two fuel injectors are attached on each of air-intake passages 103 as shown in FIG. 25. In the second embodiment, the engine E2 will be referenced by reference numbers obtained by adding one hundred to those reference numbers for the components in the first embodiment. In the second embodiment, distinctions between the first embodiment and the second embodiment in large part will be described. In the second embodiment, the same reference numerals as those of the first embodiment denote the same or corresponding components which will not be further described.

As shown in FIG. 25, the engine E2 of the second embodiment is equipped with a fuel injector 101 consisting of a first fuel injector (main fuel injector) 101A having an injection nozzle for injecting a fuel into the air-intake passage 103 and a second fuel injector (top fuel injector) 100B having an injection nozzle for injecting the fuel into the air-intake passage 103 and located upstream of the first fuel injector 101A. Correspondingly, in the second embodiment, a throttle valve 107 consisting of a first throttle valve 107A and a second throttle valve 107B is disposed within the air-intake passage 103 in such a manner that the first throttle valve 107A is located adjacent and upstream of the first fuel injector 101A, and the second throttle valve 107B is located adjacent and downstream of the second fuel injector 101B, and upstream of the first throttle valve 107A. Instead of the two throttle valves 107A and 107B, a single throttle valve may be provided.

A first throttle position sensor 108A is disposed in the vicinity of a rotational shaft of the first throttle valve 107A and is configured to detect a rotation of the first throttle valve 107A. A second throttle position sensor 108B is disposed in the vicinity of a rotational shaft of the second throttle valve 107B and is configured to detect a rotation of the second throttle valve 107B.

As in the first embodiment, in the second embodiment, a fuel injection controller 102 calculates the compensation value (compensation coefficient $\zeta$) and compensates the base fuel injection amount Ft to obtain the actual fuel injection amount Ft as shown in FIG. 13. In the second embodiment, the actual fuel injection amount Fy, which is a total fuel injection amount of the first and second fuel injectors 101A and 101B, is divided into a first actual fuel injection amount Fy1 and a second actual fuel injection amount Fy2 with predetermined fuel injection amount ratios $\gamma$ and $(1-\gamma)$ of the first fuel injector 101A and the second fuel injector 101B. The fuel of the first actual fuel injection amount Fy1 is injected from the first fuel injector 101A, and the fuel of the second actual fuel injection amount Fy2 is injected from the second injector 101B.

Further, change states of the fuel injection amount ratio between the first fuel injector 101A and the second fuel injector 101B in a transitional running state at the time of start of acceleration or deceleration in which the fuel injection amount ratio changes are compensated by delaying a fuel injection start timing or limiting the change rates of the fuel injection amount of the first fuel injector 101A and the fuel injection amount of the second fuel injector 101B.

The fuel injection controller 102 controls the amount of fuel injected from the fuel injector 101, fuel injection timings therefor, etc. The processing unit 102A of the fuel injection controller 102 runs the programs stored in the fuel injection controller 102 to divide the predicted air-intake amount It at that point of time by an optimal air-fuel ratio $\epsilon$, thereby obtaining the desired fuel feed amount Q, and obtains the fuel injection amount Fx of the fuel to be injected in the corresponding intake stroke, using the compensation logic of the wall surface adhesion compensation logic. Then, the fuel injection controller 102 obtains (compensation coefficient $\zeta$) from the fuel injection amount Fx and the desired fuel feed amount Q and compensates the base fuel injection amount Ft with the compensation value to obtain the actual fuel injection amount Fy, as already described in the first embodiment.

In the second embodiment, the fuel injection controller 102 is configured to determine, under the conditions below, whether only the first fuel injector 101A injects the fuel of the actual fuel injection amount Fy, or the first fuel injector 101A and the second fuel injector 102B inject the fuel of the actual fuel injection amount Fy in the predetermined fuel injection amount ratio. The fuel injection controller 102 makes determinations as to whether only the first fuel injector 101A injects the fuel or both of the first fuel injector 101A and the second fuel injector 101B inject the fuel, or as to the fuel injection amount ratio between the first fuel injector 101A and the second fuel injector 101B, according to the programs stored in the fuel injection controller 102.

The fuel injection controller 102 causes only the first fuel injector 101A to inject the fuel of the actual fuel injection amount Fy in a lower output range of the engine E2, and causes both the first fuel injector 101A and the second fuel injector 101B to inject the fuel of the actual fuel injection amount Fy (=Fy1+Fy2) with the predetermined fuel injection amount ratio in a higher output range of the engine E2 so that the first fuel injector 101A injects the fuel of the first actual fuel injection amount Fy1 and the second fuel injector 101 injects the fuel of the second actual fuel injection amount Fy2. In the second embodiment, it is determined whether or not the engine E2 is in the lower output range or in the higher output range, from the engine speed of the engine E2 and the opening degree of the throttle valve 107. To be specific, for example, when the engine speed of the engine E2 is 2500 rpm or higher and the throttle valve 107 is opened to 60 degrees or larger, or when the engine speed of the engine E2 is 6500 rpm or higher and the throttle valve 107 is opened to 40 degrees or larger, assuming that a full opening degree of the throttle valve 107 is 90 degrees, it is determined that the engine E2 is in the higher output range. Note that a boundary between the higher output range and the lower output range should be determined in view of throttle opening degrees corresponding to all engine speeds. In other words, the boundary between the higher output range and the lower output range should be determined continuously in time series with respect to the whole engine speed range of the engine E2. In the second embodiment, for easier understanding, the engine speed and the opening degree of the throttle valve 107 are used. The illustrated values of the engine speed and the opening degree of the throttle valve 107 are merely exemplary.

Figure 26:
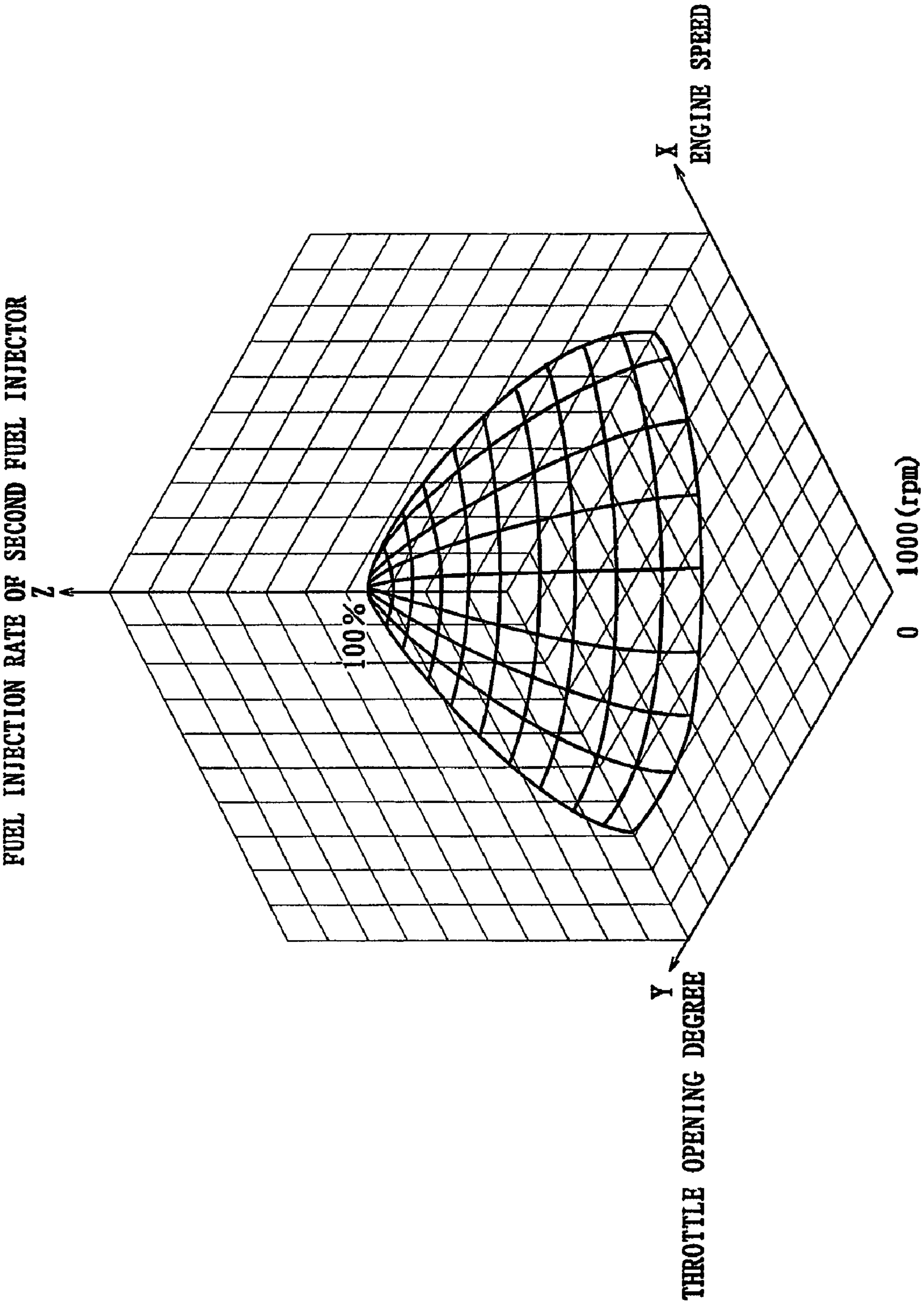
FIG. 26 is a three-dimensional map used to determine a fuel injection amount rate of a second fuel injector (upstream side injector), in which the X-axis indicates the engine speed, the Y-axis indicates the throttle opening degree; and the Z-axis indicates a percentage of the fuel injection amount rate of the second fuel injector with respect to a full fuel injection amount of the second fuel injector.

Regarding the fuel injection amount ratio, a fuel injection amount rate ($\gamma$1) with respect to the fuel injection ability of the second fuel injector 101B is determined using a three-dimensional map created with the engine speed on the X-axis, the throttle opening degree on the Y-axis, and the fuel injection rate ($\gamma$1) shown by a percentage value on the Z-axis, as shown in FIG. 26. Then, using the percentage value of the second fuel injector 101B, the predetermined fuel injection amount ratio between the first fuel injector 101A and the second fuel injector 101B is determined in such a manner that, when the fuel injection ratio, γ1, of the second fuel injector 101B with respect to the total fuel injection amount, Fy, of the first fuel injector 101A and of the second fuel injector 101B, for example, a rate of a full fuel injection capacity of the second fuel injector 101B to the total fuel injection amount of the first fuel injector 101A and of the second fuel injector 101B, is 50%, the fuel injection amount ratio, γ, of the second fuel injector 101B, is obtained by multiplying the percentage value (γ1) of the second fuel injector 101B by 0.5, and a fuel injection amount ratio (1−γ) of the first fuel injector 101A is obtained by subtracting γ from 1.

For example, when the value γ of the second fuel injector 101B is 30%, the value (1−γ) of the first fuel injector 101A is 70%. That is, the fuel injection amount ratio between the first fuel injector 101A and the second fuel injector 101B is 7:3. In the second embodiment, the fuel injection capacity (maximum percentage value) of the second fuel injector 101B is 50%, but may be other values, for example, 40% or 60%. The percentage values are suitably determined depending on type of the engine or desired engine performance.

Figure 27:
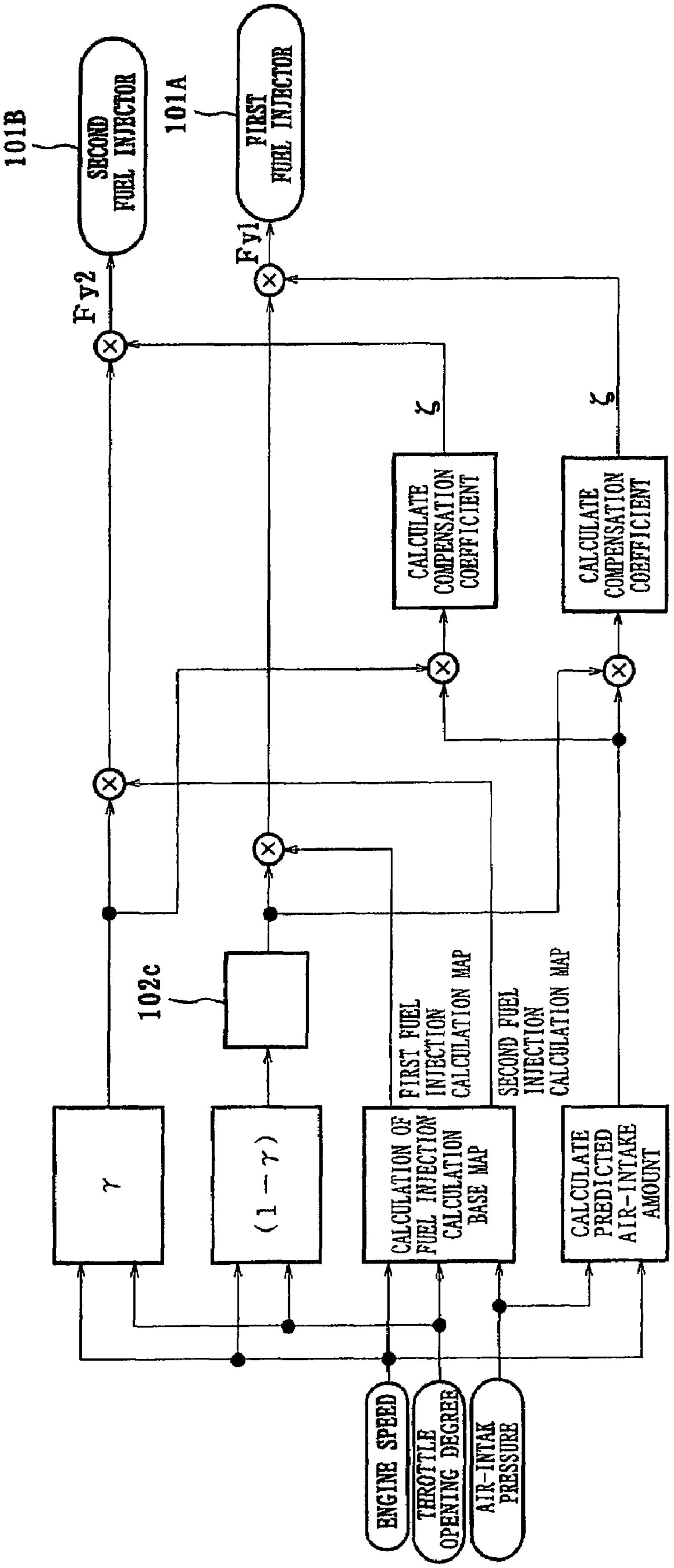
FIG. 27 is a block diagram schematically showing a control logic relating to fuel injection of the engine of FIG. 25.

As described above, in the higher output range, the first fuel injector 101A and the second fuel injector 101B respectively inject the fuel with the fuel injection amount ratio that is varied according to the engine speed and the throttle opening degree under control of the fuel injection controller 102. FIG. 27 shows a block diagram schematically showing a control logic relating to the fuel injection of the engine E2 of FIG. 25. In cases where the first fuel injector 101A and the second fuel injector 101B inject respectively the fuel with the predetermined fuel injection amount ratios γ and (1−γ), a compensation unit 102*c* is disposed within a transmission path of the control logic for determining that the first fuel injector 101A should inject the fuel as shown in FIG. 27. The compensation unit 102*c* serves to more gradually decrease the rate of the fuel injection amount of the first fuel injector 101A in the transitional running state that is the acceleration state in which both the first fuel injector 101A and the second fuel injector 101B inject the fuel, or more gradually increase the rate of the fuel injection amount of the first fuel injector 101A in the transitional running state that is the deceleration state in which only the first fuel injector 101A injects the fuel from the state where the first fuel injector 101A and the second fuel injector 101B inject the fuel, as compared to cases where the compensation control is not executed.

Figures 28A, 28B, 28C, 28D, 28E:
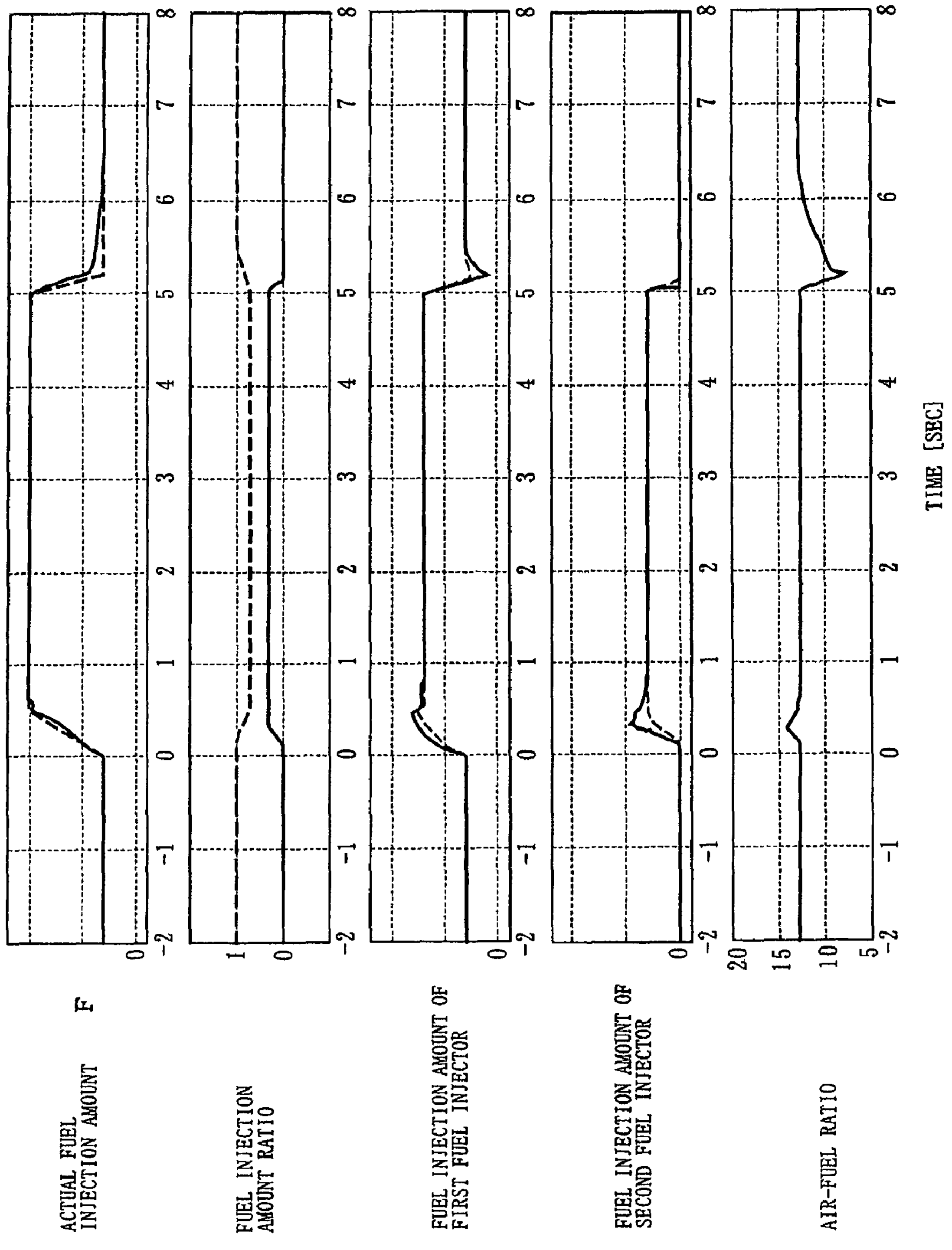
FIG. 28A is a graph showing time-lapse changes of a desired fuel injection amount and an amount of a fuel actually fed to a cylinder in the engine of FIG. 25, in which the horizontal axis indicates time, the vertical axis indicates a fuel amount, a broken line indicates a change of the desired fuel injection amount obtained by dividing the predicted air-intake amount by optimal air-fuel ratio, and a solid line indicates a change of the amount of fuel actually fed to the cylinder.
FIG. 28B is a graph showing time-lapse changes of fuel injection amount ratio based on a compensated fuel injection amount ratio between a fuel injection amount of the first fuel injector and a fuel injection amount of the second fuel injector in the engine of FIG. 25, in which the horizontal axis indicates time, the vertical axis indicates the fuel injection amount ratio, a broken line indicates a change of the fuel injection amount ratio of the first fuel injector, and a solid line indicates a change of the fuel injection amount ratio of the second fuel injector.
FIG. 28C is a view showing time-lapse changes of fuel injection amounts of the fuel from the first fuel injector before and after the wall surface adhesion compensation control based on the predicted air-intake amount in the engine of FIG. 25, in which the horizontal axis indicates time, the vertical axis indicates a fuel injection amount, a broken line indicates a change of the fuel injection amount of the first fuel injector before the wall surface adhesion compensation control, and a solid line indicates a change of the fuel injection amount of the first fuel injector after the wall surface adhesion compensation control.
FIG. 28D is a view showing time-lapse changes of fuel injection amounts of the fuel from the second fuel injector before and after the wall surface adhesion compensation control based on the predicted air-intake amount in the engine of FIG. 25, in which the horizontal axis indicates time, the vertical axis indicates a fuel injection amount, a broken line indicates a change of the fuel injection amount of the second fuel injector before the wall surface adhesion compensation control, and a solid line indicates a change of the fuel injection amount of the second fuel injector after the wall surface adhesion compensation control.
FIG. 28E is a view showing a time-lapse change of a compensated air-fuel ratio, in which the horizontal axis indicates time and the vertical axis indicates the air-fuel ratio.

FIG. 28B shows the fuel injection amount ratio between the first fuel injector 101A and the second fuel injector 101B. As shown in FIG. 28B, the compensation control is executed to limit the change rate of the amount of the fuel injected so that, from time 0 to 1 on the time axis, the second fuel injector 101B starts fuel injection and increases its amount as indicated by a solid line, and the change rate of the fuel injection amount of the first fuel injector 101A decreases more gradually as indicated by a broken line, in the transitional running state that is the acceleration state in which both the first fuel injector 101A and the second fuel injector 101B inject the fuel, as compared to the case where the compensation control is not executed. For this reason, in the transitional running state that is the acceleration state, the amount of the fuel fed to the cylinder 19 in total is increased because of the gradual decrease in the amount of the fuel injected from the first fuel injector 101A.

Also, as shown in FIG. 28B, the compensation control is executed to limit the change rate of the amount of the fuel injected so that, from time 5 to 6 on the time axis, the second fuel injector 101B terminates the fuel injection or decreases its amount as indicated by a solid line, and the change rate of the fuel injection amount of the first fuel injector 101A is increased more gradually as indicated by a broken line, in the transitional running state that is the deceleration state from the acceleration state, as compared to the case where the compensation control is not executed. For this reason, in the transitional running state that is the deceleration state, the amount of the fuel fed to the cylinder 19 is decreased in total, because the second fuel injector 101B terminates fuel injection or decreases its amount, and the change rate of the fuel injection amount of the first fuel injector 101A is gradually increased.

Figures 29A, 29B, 29C, 29D, 29E:
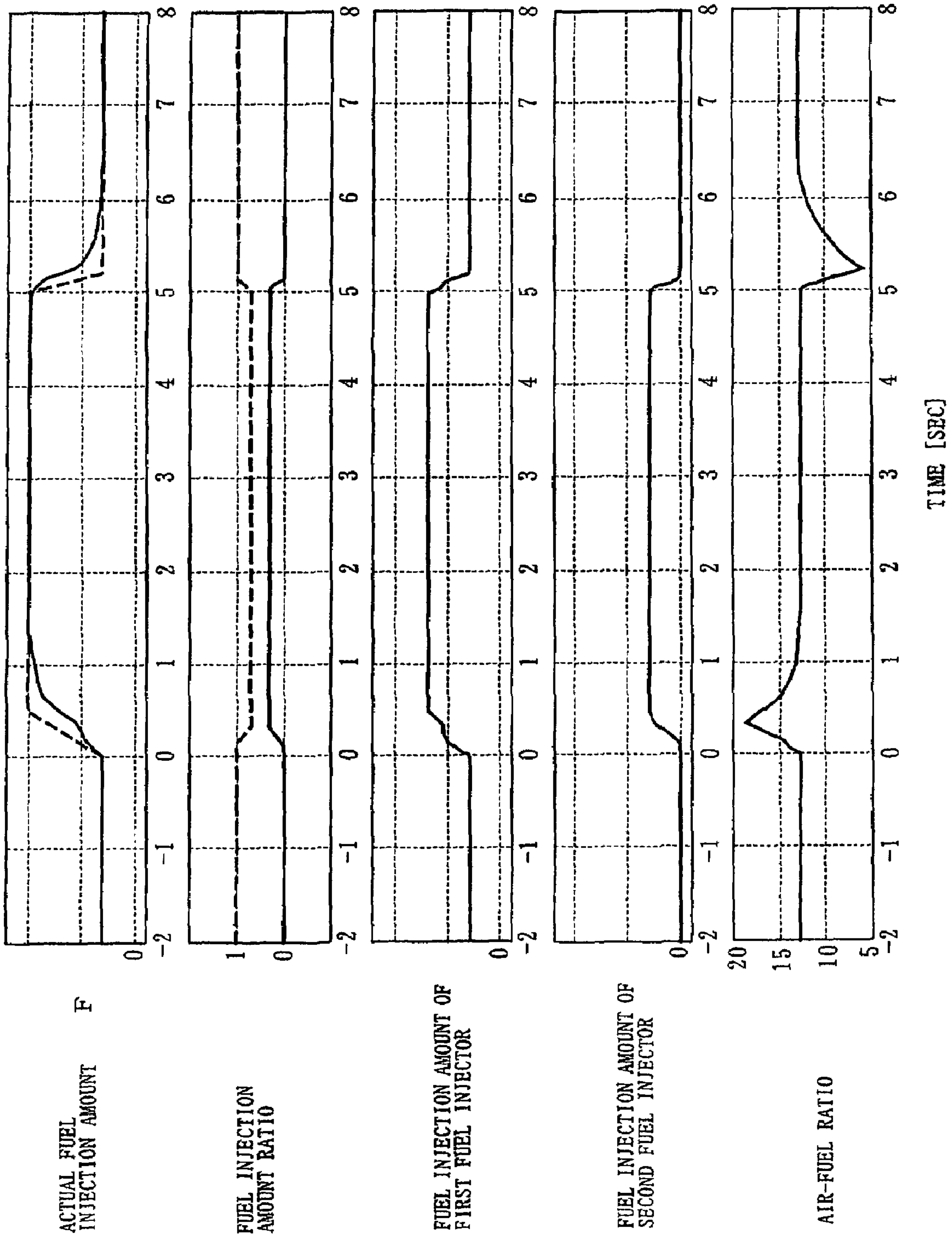
FIG. 29A is a view showing time-lapse changes of a desired fuel injection amount and an amount of the fuel actually fed to the cylinder in a conventional twin-injector engine having the same configuration as the engine of FIG. 25, in which the horizontal axis indicates time, the vertical axis indicates a fuel amount, a broken line indicates a change of the desired fuel injection amount obtained by dividing the predicted air-intake amount by the optimal air-fuel ratio, and a solid line indicates a change of the amount of the fuel actually fed to the cylinder.
FIG. 29B is a view showing time-lapse changes of fuel injection amount ratio between the fuel injection amount of the first fuel injector and the fuel injection amount of the second fuel injector in the conventional twin-injector engine, in which the horizontal axis indicates time, the vertical axis indicates a fuel injection amount ratio, a broken line indicates a change of the fuel injection amount ratio of the first fuel injector, and a solid line indicates a change of the fuel injection amount ratio of the second fuel injector.
FIG. 29C is a view showing time-lapse changes of fuel injection amounts of the fuel from the first fuel injector in the conventional twin-injector engine, in which horizontal axis indicates time, and vertical axis indicates a fuel injection amount.
FIG. 29D is a view showing time-lapse changes of fuel injection amounts of the fuel from the second fuel injector in the conventional twin-injector engine, in which horizontal axis indicates time, and vertical axis indicates a fuel injection amount.
FIG. 29E is a view showing a time-lapse change of the air-fuel ratio in the conventional twin-injector engine, in which the horizontal axis indicates time and the vertical axis indicates the air-fuel ratio.
Figures 30A, 30B, 30C, 30D, 30E:
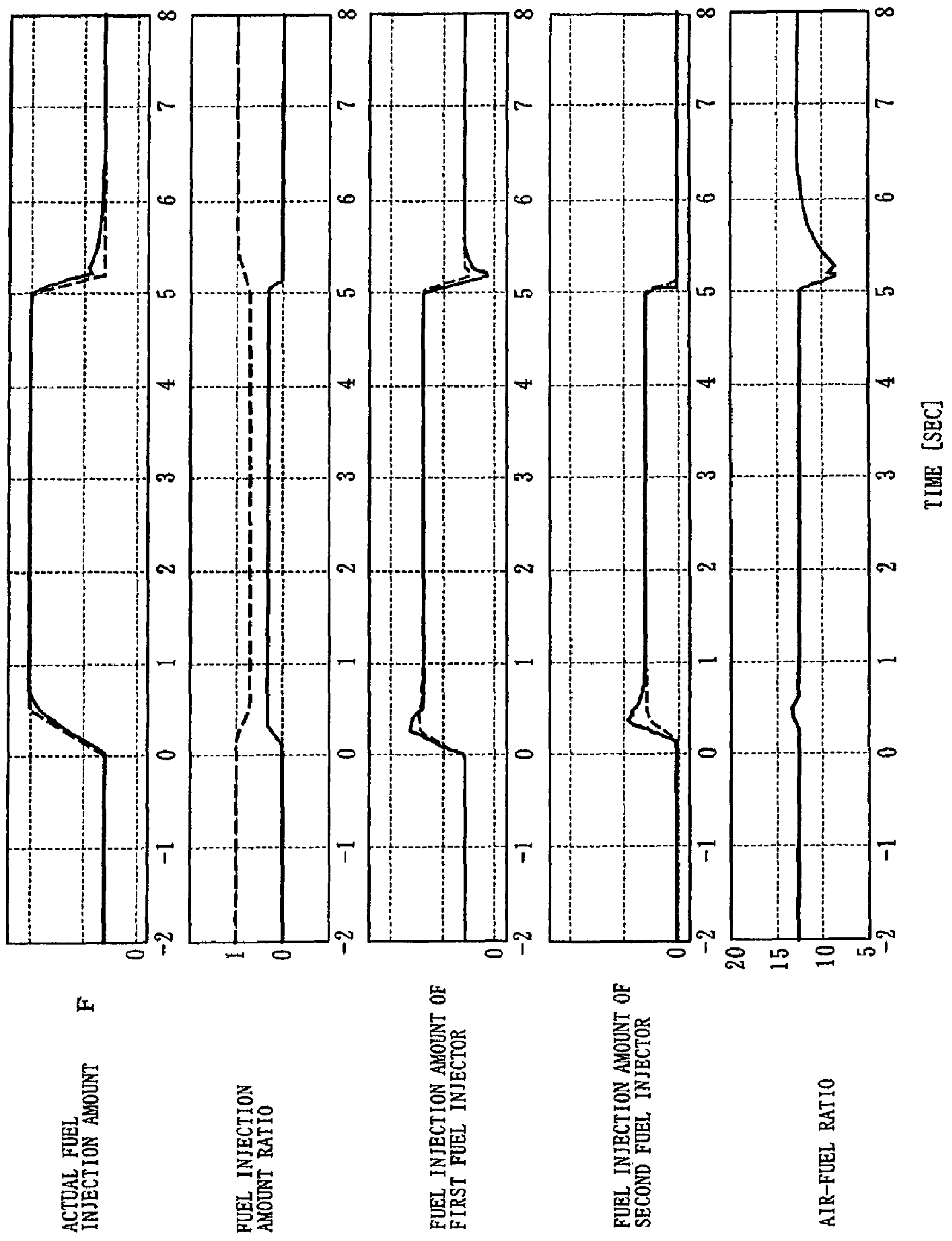
FIG. 30A is a view showing time-lapse changes of a desired fuel injection amount and an amount of the fuel actually fed to the cylinder in an engine similar to the engine of FIG. 25, which is configured to execute compensation control different from that of FIG. 28, in which the horizontal axis indicates time, the vertical axis indicates a fuel amount, a broken line indicates a change of the desired fuel injection amount obtained by dividing the predicted air-intake amount by the air-fuel ratio, and a solid line indicates a change of the amount of the fuel actually fed to the cylinder.
FIG. 30B is a view showing time-lapse changes of fuel injection amount ratio based on a compensated fuel injection amount ratio between the fuel injection amount of the first fuel injector and the fuel injection amount of the second fuel injector in the engine which is configured to execute compensation different from that of FIG. 28, in which the horizontal axis indicates time, the vertical axis indicates a fuel injection amount ratio, a broken line indicates a change of the fuel injection amount ratio of the first fuel injector, and a solid line indicates a change of the fuel injection amount ratio of the second fuel injector.
FIG. 30C is a view showing time-lapse changes of fuel injection amounts of the fuel from the first fuel injector before and after the wall surface adhesion compensation control based on the predicted air-intake amount in the engine configured to execute compensation different from that of FIG. 28, in which the horizontal axis indicates time, the vertical axis indicates a fuel injection amount, a broken line indicates a change of the fuel injection amount of the first fuel injector before the wall surface adhesion compensation control, and a solid line indicates a change of the fuel injection amount of the first fuel injector after the wall surface adhesion compensation control.
FIG. 30D is a view showing time-lapse changes of fuel injection amounts of the fuel from the second fuel injector before and after the wall surface adhesion compensation control based on the predicted air-intake amount in the engine configured to execute compensation different from that of FIG. 28, in which the horizontal axis indicates time, the vertical axis indicates a fuel injection amount, a broken line indicates a change of the fuel injection amount of the second fuel injector before the wall surface adhesion compensation control, and a solid line indicates a change of the fuel injection amount of the second fuel injector after the wall surface adhesion compensation control.
FIG. 30E is a view showing a time-lapse change of the air-fuel ratio in the engine configured to execute compensation different from that of FIG. 28, in the which horizontal axis indicates time and the vertical axis indicates the air-fuel ratio.

Therefore, as indicated by a solid line of FIG. 28A, even in the transitional running state, the fuel of the correct actual fuel injection amount, Fy (=Fy1+Fy2), is injected at correct timings. As a result, as indicated by a solid line of FIG. 28E, a substantially correct air-fuel ratio is obtained, as compared to an air-fuel ratio of the conventional engine that is indicated by a solid line of FIG. 29E. This inhibits the air-fuel ratio from increasing because of the lean air-fuel ratio in the acceleration state or from decreasing because of the overly-rich air-fuel ratio in the deceleration state. Thus, smooth acceleration and deceleration are achieved, and a clean exhaust gas can be emitted. Such an advantage is noticeably observed in comparison between FIG. 28 and FIG. 29 showing parameters associated with the conventional engine for which compensation control in the transitional running state and the wall surface adhesion compensation control based on the predicted air-intake amount It are not executed. As can be seen from comparison between FIG. 28A, and FIGS. 28C to 28E, and FIG. 29A, and FIGS. 29C to 29E, the fuel is increased quickly in the acceleration state and is reduced quickly in the deceleration state, so that the fuel is fed to the cylinder 19 with the amount and at timing that substantially conform to the above described desired fuel injection amount and timing, and thus a more correct air-fuel ratio is achieved.

The compensation control for inhibiting the air-fuel ratio from increasing because of the lean air-fuel ratio or decreasing because of the overly rich air-fuel ratio may be executed by incorporating the compensation for limiting the maximum value of the change rate into the control logic of the first fuel injector 101A as described above, or alternatively by delaying start timing of the change in the transitional running state. In that case, as shown in FIG. 30A, and FIGS. 30C to 30E, substantially the same advantages as those of FIG. 28A, and FIGS. 28C to 28E are achieved. The start timing of the change in the transitional running state is delayed, to be more specific, the timing at which the fuel injected from the first fuel injector 101A is decreased is delayed in the transitional running state that is the acceleration state, and the timing at which the fuel injected from the first fuel injector 101A is increased is delayed in the transitional running state that is the deceleration state, by incorporating an idle time into the control logic of the first fuel injector 101A, or by providing a first order lag filter in the control logic of the first fuel injector 101A. By incorporating the idle time or providing the first order lag filter to execute the compensation control, the advantages of the present invention as shown in FIG. 28A, FIGS. 28C to 28E can be achieved. Alternatively, compensation control for phase advancement may be executed so that the fuel injection amount per unit of time injected from the second fuel injector 101B is increased or decreased.

As shown in FIG. 27, the wall surface adhesion compensation control is executed for the first fuel injector 101A and the second fuel injector 101B as in the first embodiment. As indicated by solid lines in FIGS. 28C and 28D, the compensation control enables an optimal amount of fuel to be fed at optimal timings to respond highly to the throttle operation in the transitional running states, as compared to the case where the wall surface adhesion compensation control is not executed. As a result, as indicated by a solid line in FIG. 28A, the fuel is fed to the cylinder 19 so as to conform to a change in the desired fuel injection amount indicated by a broken line in FIG. 28A. In FIGS. 28A to 28E, FIGS. 29A to 29E, and FIGS. 30A to 30E, in overlap regions of the solid lines and broken lines, the broken lines are located under the solid lines.

Embodiment 3

An internal combustion engine having a simple configuration according to a third embodiment of compensation control based on the predicted air-intake amount It and the wall surface adhesion compensation will be described. In the third embodiment, instead of using the base fuel injection amount Ft used in the first or second embodiment, the desired fuel feed amount Q is calculated by dividing the predicted air-intake amount It by the optimal air-fuel ratio $\epsilon$. The fuel injection amount Fx of the fuel to be injected is found based on the desired fuel feed amount Q using the wall surface adhesion compensation logic. The fuel injection amount Fx may be determined as the actual fuel injection amount Fy, and the fuel of the fuel injection amount Fx may be injected from the fuel injector 1 or 101. Alternatively, in a simplified configuration, the desired fuel injection amount Q may be determined as the actual fuel injection amount Fy, and the fuel of the desired fuel injection amount Q may be injected from the fuel injector 1 or 101. In those cases, the configuration becomes very simple.

Whereas in the above described embodiments, the present invention is applied to a four-cylinder internal combustion engine, it may be applied to internal combustion engines including five or more cylinders or a single cylinder.

The wall surface adhesion compensation logic in the above described embodiments may be omitted in internal combustion engines which run in steady running state most of the time, such as those for farming machines or lifting pumps. Furthermore, the present invention is applied to internal combustion engines equipped with two or more fuel injectors.

The calculation executed in the above embodiments may be replaced by maps, or the maps used in the above embodiments may be replaced by calculation(s). Moreover, the calculation(s) executed in the above embodiments may be replaced by any other suitable calculation(s), or the maps used in the above described embodiments may be replaced by any other suitable maps.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of estimating an air-intake amount of an internal combustion engine, comprising:

detecting a value of a fluid energy amount in an interior of an air-intake passage of the engine at a first point and a value of the fluid energy amount in the interior of the air-intake passage at a second point that is apart in time from the first point in a period during which an intake valve is closed from a compression stroke to an exhaust stroke in one cycle of the internal combustion engine, by a detecting device that is disposed in the air-intake passage of the internal combustion engine to detect the fluid energy amount; and calculating a predicted air-intake amount in an intake stroke of the engine by a calculation using the values of the fluid energy amounts at the first and second points with reference to an air-intake amount calculation map showing a correlation between the values of the fluid energy amounts at the first and second points and the predicted air-intake amount in the intake stroke in which the fuel is injected, the air-intake amount calculation map being pre-created by finding the values of the fluid energy amounts in the air-intake passage at the first and second points and the air-intake amount, for plural running states of the internal combustion engine.

2. The method according to claim 1, wherein the detecting device is at least one of a pressure sensor, a flow rate sensor, and a fluid speed sensor, and the value of the fluid energy amount is one of a pressure value, a flow rate value, and a fluid speed value.

3. The method according to claim 1, wherein the air-intake amount calculation map is a three-dimensional map.

4. The method according to claim 3, wherein the three-dimensional map has an X-axis indicating the detected value of the fluid energy amount at the first point, a Y-axis perpendicular to the X-axis indicating the value of the fluid energy amount of the second point, and a Z-axis perpendicular to the X-axis and the Y-axis indicating the value of the intake-amount corresponding to the values of the first and second points, which is a value on the air-intake amount calculation map that is obtained by extending in the Z-axis direction an intersection on X and Y coordinates of the first point on the X-axis and of the second point on the Y-axis.

5. An air-intake amount estimating system for an internal combustion engine, comprising:

a detecting device that is disposed in an air-intake passage of the internal combustion engine and is configured to detect a value of a fluid energy amount in an interior of the air-intake passage;

a memory configured to store an air-intake amount calculation map pre-created to show a correlation between the values of the fluid energy amount in the interior of the air-intake passage and a predicted air-intake amount in an intake stroke in which a fuel is injected; and a processing unit configured to calculate the predicted air-intake amount in the intake stroke, using data relating to a value of the fluid energy amount in the interior of the air-intake passage at a first point and a value of the fluid energy amount in the interior of the air-intake passage at a second point that is apart in time from the first point in a period during which an intake valve is closed from a compression stroke to an exhaust stroke in one cycle of the internal combustion engine, the data being obtained from the detecting device, and with reference to the air-intake amount calculation map stored in the memory.

6. The estimating system according to claim 5, wherein the air-intake amount calculation map is a three-dimensional map in which an X-axis indicates the detected value of the fluid energy amount at the first point, a Y-axis perpendicular to the X-axis indicates the value of the fluid energy amount of the second point, and a Z-axis perpendicular to the X-axis and the Y-axis indicates the value of the predicted intake-amount corresponding to the values of the first and second points, which is a value on the air-intake amount calculation map that is obtained by extending in the Z-axis direction an intersection on X and Y coordinates of the first point on the X-axis and of the second point on the Y-axis.

7. The estimating system according to claim 5, wherein the detecting device is at least one of a pressure sensor, a flow rate sensor, and a fluid speed sensor, and the value of the fluid energy amount is one of a pressure value, a flow rate value, and a fluid speed value.

8. An internal combustion engine comprising:

a fuel injection controller configured to determine an actual fuel injection amount of a fuel injected from a fuel injector into an interior of an air-intake passage of the engine;

wherein the fuel injection controller is configured to estimate a predicted air-intake amount in an intake stroke in which the fuel is injected, and to determine the actual fuel injection amount of the fuel based on the estimated predicted air-intake amount; and wherein the fuel injection controller is configured to determine the actual fuel injection amount by executing a base fuel injection amount determination control for determining a base fuel injection amount using as parameters an engine speed, a throttle opening degree, and an air-intake pressure of the internal combustion engine before injecting the fuel, and by executing a compensation control of the base fuel injection amount based on the predicted air-intake amount.

9. The internal combustion engine according to claim 8, wherein the compensation control is executed based on an amount of the fuel adhering onto a wall surface of the air-intake passage and an amount of the fuel vaporized from the fuel on the wall surface to be fed to a cylinder.

10. The internal combustion engine according to claim 8, wherein the predicted air-intake amount is determined based on a detected value of a fluid energy amount of air-intake within the air-intake passage.

11. The internal combustion engine according to claim 10, wherein the value of the fluid energy amount of air-intake is a value of at least one of the air-intake pressure, the air-intake amount, and the air-intake speed.

12. The internal combustion engine according to claim 10, wherein the predicted air-intake amount is determined based on a value of the engine speed of the internal combustion engine.

13. The internal combustion engine according to claim 10, wherein the detected value of the fluid energy amount includes values detected at a first point and a second point that is apart in time from the first point in a period during which an intake valve is closed from a compression stroke to an exhaust stroke in one cycle of the internal combustion engine.

14. The internal combustion engine according to claim 13, wherein one of the first and second points is near a bottom dead center at which the compression stroke of the internal combustion engine starts.

15. The internal combustion engine according to claim 13, wherein the fuel injection controller has an air-intake amount calculation map pre-created to show a correlation between the air-intake amount of the engine and the values of energy amounts at the first and second points, for plural running states of the engine, and the predicted air-intake amount is calculated with reference to the air-intake amount calculation map by substituting the detected values of the fluid energy amounts at the first and second points.

16. An internal combustion engine comprising:

a fuel injection controller configured to determine an actual fuel injection amount of a fuel injected from a fuel injector into an interior of an air-intake passage of the engine;

wherein the fuel injection controller is configured to estimate a predicted air-intake amount in an intake stroke in which the fuel is injected, and to determine the actual fuel injection amount of the fuel based on the estimated predicted air-intake amount;

wherein the fuel injector includes a first fuel injector provided in the air-intake passage, and a second fuel injector provided in the air-intake passage at a region to be located upstream of the first fuel injector; and wherein the fuel injection controller is configured to control the first fuel injector and the second fuel injector in such a manner that in a lower output range of the internal combustion engine, the first fuel injector injects the fuel in a large part, while in a higher output range of the internal combustion engine that is higher than the lower output range, the first fuel injector and the second fuel injector inject the fuel of the determined actual fuel injection amount with a predetermined fuel injection amount ratio.

17. The internal combustion engine according to claim 16, wherein the fuel injection controller is configured to control the first fuel injector and the second fuel injector so that in a transitional running state that is an acceleration state in which the first fuel injector and the second fuel injector inject the fuel, a predetermined fuel injection amount ratio between the first fuel injector and the second fuel injector in a steady running state of the internal combustion engine is compensated such that a rate of a fuel injection amount of the first fuel injector is increased and a rate of a fuel injection amount of the second fuel injector is decreased for a moment.

18. The internal combustion engine according to claim 16, wherein the fuel injection controller is configured to control the first fuel injector and the second fuel injector so that in a transitional running state that is a deceleration state from a state in which the first fuel injector and the second fuel injector inject the fuel, the predetermined fuel injection amount ratio between the first fuel injector and the second fuel injector in a steady running state of the internal combustion engine is compensated such that a rate of a fuel injection amount of the first fuel injector is decreased and a rate of a fuel injection amount of the second fuel injector is increased for a moment.

* * * * *